US009313100B1

(12) United States Patent
Jenkins et al.

(10) Patent No.: US 9,313,100 B1
(45) Date of Patent: Apr. 12, 2016

(54) REMOTE BROWSING SESSION MANAGEMENT

(75) Inventors: Jonathan A. Jenkins, Seattle, WA (US); Peter F. Hill, Seattle, WA (US); Brett R. Taylor, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 277 days.

(21) Appl. No.: 13/296,134

(22) Filed: Nov. 14, 2011

(51) Int. Cl.
 G06F 15/177 (2006.01)
 H04L 12/24 (2006.01)
 H04L 29/08 (2006.01)
 H04L 29/06 (2006.01)

(52) U.S. Cl.
 CPC ........ H04L 41/0893 (2013.01); H04L 63/0421 (2013.01); H04L 67/02 (2013.01)

(58) Field of Classification Search
 CPC . H04L 9/321; H04L 63/0407; H04L 63/0428; H04L 67/306; H04L 63/20; H04L 2209/42; H04L 29/08702; H04L 29/08756; H04L 67/02; H04L 12/2602; H04L 41/0803; H04L 41/0853; H04L 63/0272; H04L 63/0281; H04L 63/0421; H04L 63/0471; H04L 63/10; H04L 63/126; H04L 67/42; H04L 69/329; G06Q 20/382; G06Q 20/401; G06Q 10/06; H04W 12/00; H04W 12/02; H04W 12/12; G06F 2009/45595; G06F 2009/45587; G06F 21/53; G06F 9/4445; G06F 17/3089
See application file for complete search history.

(56) References Cited

U.S. PATENT DOCUMENTS 5,634,064 A 5/1997 Warnock et al.
5,809,250 A 9/1998 Kisor
(Continued)

FOREIGN PATENT DOCUMENTS

WO WO 01/67233 A2 9/2001
WO WO 2013/003631 A2 1/2013
WO WO 2013/049025 A1 4/2013

OTHER PUBLICATIONS

Chen, H., et al., "Bringing Order to the Web: Automatically Categorizing Search Results," Proceedings of the SIGCHI Conference on Human Factors in Computing Systems, Apr. 1-6, 2000, pp. 145-152.
Bango, Rey, "How JS & Ajax work in Opera Mini 4", Nov. 2, 2007, XP055050107, Retrieved from the Internet.
Brinkmann, M., "Record and Share your browser history with Hooeey," ghacks.net, Feb. 26, 2008, 6 pages, printed on Jan. 25, 2013.
Considine, A., "The Footprints of Web Feet," The New York Times, Mar. 4, 2011, 3 pages, printed on Jan. 25, 2013.
(Continued)

Primary Examiner — Dustin Nguyen
Assistant Examiner — Hao Nguyen
(74) Attorney, Agent, or Firm — Knobbe Martens Olson & Bear LLP

(57) ABSTRACT

A browsing process is directed to the generation and management of a browse session at a network computing provider. A client computing device requests a remote browse session instance at a network computing provider. The browse session instance may correspond to requests for network content, and the requests may include information that can be used to identify the client computing device or its user. The network computing provider can remove identification information from the request before passing it to the content provider. The network computing provider retrieves the requested content and performs a first set of processing actions to generate a processing result. The processing actions can include removing identification information that was retrieved with the content. The processing result may be provided to the client computing device for display, including performing a second set of processing actions on the processing result at the client computing device.

27 Claims, 19 Drawing Sheets

(56) References Cited

U.S. PATENT DOCUMENTS

| | | | |
|---|---|---|---|
| 5,872,850 A | 2/1999 | Klein et al. |
| 5,930,752 A | 7/1999 | Kawaguchi et al. |
| 5,961,593 A | 10/1999 | Gabber et al. |
| 6,049,812 A | 4/2000 | Bertram et al. |
| 6,084,582 A | 7/2000 | Qureshi et al. |
| 6,108,637 A | 8/2000 | Blumenau |
| 6,138,156 A | 10/2000 | Fletcher et al. |
| 6,144,991 A | 11/2000 | England |
| 6,182,133 B1 | 1/2001 | Horvitz |
| 6,195,679 B1 | 2/2001 | Bauersfeld et al. |
| 6,230,266 B1 | 5/2001 | Perlman et al. |
| 6,282,542 B1 | 8/2001 | Carneal et al. |
| 6,356,934 B1 | 3/2002 | Delph |
| 6,360,366 B1 | 3/2002 | Heath |
| 6,397,253 B1 | 5/2002 | Quinlan et al. |
| 6,411,966 B1 | 6/2002 | Kwan et al. |
| 6,430,624 B1 | 8/2002 | Jamtgaard et al. |
| 6,438,597 B1 | 8/2002 | Mosberger et al. |
| 6,513,061 B1 * | 1/2003 | Ebata et al. ............... 709/203 |
| 6,549,941 B1 | 4/2003 | Jaquith et al. |
| 6,560,620 B1 | 5/2003 | Ching |
| 6,560,705 B1 | 5/2003 | Perlman et al. |
| 6,625,624 B1 | 9/2003 | Chen et al. |
| 6,633,316 B1 | 10/2003 | Maddalozzo et al. |
| 6,691,106 B1 | 2/2004 | Sathyanarayan |
| 6,704,024 B2 | 3/2004 | Robotham et al. |
| 6,704,204 B1 | 3/2004 | Eskildsen et al. |
| 6,725,269 B1 | 4/2004 | Megiddo |
| 6,728,763 B1 | 4/2004 | Chen |
| 6,785,864 B1 | 8/2004 | Te et al. |
| 6,842,777 B1 | 1/2005 | Tuli |
| 6,871,213 B1 | 3/2005 | Graham et al. |
| 6,871,236 B2 | 3/2005 | Fishman et al. |
| 6,931,439 B1 | 8/2005 | Hanmann et al. |
| 6,944,665 B2 | 9/2005 | Brown et al. |
| 6,963,850 B1 | 11/2005 | Bezos et al. |
| 6,976,059 B1 | 12/2005 | Rogalski et al. |
| 7,003,442 B1 | 2/2006 | Tsuda |
| 7,013,310 B2 | 3/2006 | Messing et al. |
| 7,051,084 B1 | 5/2006 | Hayton et al. |
| 7,054,952 B1 | 5/2006 | Schwerdtfeger et al. |
| 7,082,476 B1 | 7/2006 | Cohen et al. |
| 7,085,736 B2 | 8/2006 | Keezer et al. |
| 7,085,753 B2 | 8/2006 | Weiss et al. |
| 7,089,316 B2 | 8/2006 | Andersen et al. |
| 7,127,473 B2 | 10/2006 | Agassi et al. |
| 7,133,846 B1 | 11/2006 | Ginter et al. |
| 7,159,023 B2 | 1/2007 | Tufts |
| 7,171,478 B2 | 1/2007 | Lueckhoff et al. |
| 7,191,211 B2 | 3/2007 | Tuli |
| 7,219,136 B1 | 5/2007 | Danner et al. |
| 7,260,841 B2 | 8/2007 | Tenereillo |
| 7,274,775 B1 | 9/2007 | Zavaliagk |
| 7,353,252 B1 | 4/2008 | Yang et al. |
| 7,373,313 B1 | 5/2008 | Kahle et al. |
| 7,409,719 B2 | 8/2008 | Armstrong et al. |
| 7,426,750 B2 | 9/2008 | Cooper et al. |
| 7,428,540 B1 | 9/2008 | Coates et al. |
| 7,441,045 B2 | 10/2008 | Skene et al. |
| 7,444,337 B2 | 10/2008 | Zhou et al. |
| 7,448,079 B2 | 11/2008 | Tremain |
| 7,483,983 B1 | 1/2009 | Bonefas et al. |
| 7,484,089 B1 | 1/2009 | Kogen et al. |
| 7,509,397 B1 | 3/2009 | Totty et al. |
| 7,543,059 B2 | 6/2009 | Johnson et al. |
| 7,552,172 B2 | 6/2009 | Carboy et al. |
| 7,565,425 B2 | 7/2009 | Van Vleet et al. |
| 7,599,851 B2 | 10/2009 | Frengut et al. |
| 7,610,382 B1 | 10/2009 | Siegel |
| 7,624,047 B1 | 11/2009 | Round |
| 7,653,544 B2 | 1/2010 | Bradley et al. |
| 7,730,352 B2 | 6/2010 | Marquard et al. |
| 7,792,944 B2 | 9/2010 | DeSantis et al. |
| 7,797,421 B1 | 9/2010 | Scofield et al. |
| 7,831,582 B1 | 11/2010 | Scofield et al. |
| 7,865,528 B2 | 1/2011 | Neil |
| 7,865,720 B2 | 1/2011 | Little et al. |
| 7,890,528 B1 | 2/2011 | Khoshnevisan |
| 7,904,531 B2 | 3/2011 | Toomey |
| 7,925,782 B2 | 4/2011 | Sivasubramanian et al. |
| 7,941,450 B2 | 5/2011 | Hulaj et al. |
| 7,945,637 B2 | 5/2011 | Van Vleet et al. |
| 7,966,184 B2 | 6/2011 | O'Canar et al. |
| 7,966,395 B1 | 6/2011 | Pope et al. |
| 7,975,000 B2 | 7/2011 | Dixon et al. |
| 7,991,859 B1 | 8/2011 | Miller et al. |
| 7,996,912 B2 | 8/2011 | Spalink et al. |
| 8,010,545 B2 | 8/2011 | Stefik et al. |
| 8,010,679 B2 | 8/2011 | Low et al. |
| 8,015,343 B2 | 9/2011 | Garman et al. |
| 8,015,496 B1 | 9/2011 | Rogers |
| 8,046,435 B1 | 10/2011 | Parekh et al. |
| 8,051,166 B1 | 11/2011 | Baumback et al. |
| 8,051,180 B2 | 11/2011 | Mazzaferri et al. |
| 8,060,463 B1 | 11/2011 | Spiegel |
| 8,060,616 B1 | 11/2011 | Richardson et al. |
| 8,065,417 B1 | 11/2011 | Richardson et al. |
| 8,073,850 B1 | 12/2011 | Hubbard et al. |
| 8,079,087 B1 | 12/2011 | Spies et al. |
| 8,103,742 B1 | 1/2012 | Green |
| 8,103,769 B1 | 1/2012 | Weiser et al. |
| 8,117,314 B2 | 2/2012 | Croft et al. |
| 8,122,098 B1 | 2/2012 | Richardson et al. |
| 8,171,085 B1 | 5/2012 | Tevanian, Jr. |
| 8,185,621 B2 | 5/2012 | Kasha |
| 8,195,767 B2 | 6/2012 | Albrecht et al. |
| 8,204,359 B2 | 6/2012 | Ljolje |
| 8,209,623 B2 | 6/2012 | Barletta et al. |
| 8,224,964 B2 | 7/2012 | Fredrickson et al. |
| 8,249,904 B1 | 8/2012 | DeSantis et al. |
| 8,271,887 B2 | 9/2012 | Offer et al. |
| 8,307,396 B2 | 11/2012 | Tofighbakhsh |
| 8,316,124 B1 | 11/2012 | Baumback et al. |
| 8,336,049 B2 | 12/2012 | Medovich |
| 8,359,637 B2 | 1/2013 | Yau et al. |
| 8,386,514 B2 | 2/2013 | Cheng et al. |
| 8,391,218 B1 | 3/2013 | Joshi et al. |
| 8,392,617 B1 | 3/2013 | Weber et al. |
| 8,392,980 B1 | 3/2013 | Ahrens et al. |
| 8,448,245 B2 | 5/2013 | Banerjee et al. |
| 8,499,088 B1 | 7/2013 | Breau et al. |
| 8,510,443 B2 | 8/2013 | Kim |
| 8,560,651 B2 | 10/2013 | Venkataswami et al. |
| 8,566,137 B1 | 10/2013 | Cabrera et al. |
| 8,621,621 B1 | 12/2013 | Burns et al. |
| 8,660,129 B1 | 2/2014 | Brendel et al. |
| 8,671,022 B2 | 3/2014 | Sinn et al. |
| 8,683,585 B1 | 3/2014 | Chen et al. |
| 8,706,860 B2 | 4/2014 | Trahan et al. |
| 8,739,170 B1 | 5/2014 | Gupta et al. |
| 8,826,242 B2 | 9/2014 | Livshits et al. |
| 8,914,514 B1 | 12/2014 | Jenkins et al. |
| 2001/0036182 A1 * | 11/2001 | Addante ..................... 370/389 |
| 2001/0039490 A1 | 11/2001 | Verbitsky et al. |
| 2002/0030703 A1 | 3/2002 | Robertson et al. |
| 2002/0194302 A1 | 12/2002 | Blumberg |
| 2003/0023712 A1 | 1/2003 | Zhao et al. |
| 2003/0041106 A1 | 2/2003 | Tuli |
| 2003/0080997 A1 * | 5/2003 | Fuehren ............... G06Q 30/02 715/744 |
| 2003/0208570 A1 * | 11/2003 | Lapidous .................... 709/222 |
| 2004/0083294 A1 | 4/2004 | Lewis |
| 2004/0139208 A1 | 7/2004 | Tuli |
| 2004/0181613 A1 | 9/2004 | Hashimoto et al. |
| 2004/0205448 A1 | 10/2004 | Grefenstette et al. |
| 2004/0220905 A1 | 11/2004 | Chen et al. |
| 2004/0243622 A1 | 12/2004 | Morisawa |
| 2005/0010863 A1 | 1/2005 | Zernik |
| 2005/0060643 A1 | 3/2005 | Glass et al. |
| 2005/0138382 A1 | 6/2005 | Hougaard et al. |
| 2005/0183039 A1 | 8/2005 | Revis |
| 2005/0204276 A1 * | 9/2005 | Hosea et al. ............... 715/501.1 |
| 2005/0246193 A1 | 11/2005 | Roever et al. |
| 2006/0085766 A1 | 4/2006 | Dominowska et al. |

(56) References Cited

U.S. PATENT DOCUMENTS

| | | |
|---|---|---|
| 2006/0095336 A1 | 5/2006 | Heckerman et al. |
| 2006/0122889 A1 | 6/2006 | Burdick et al. |
| 2006/0168510 A1 | 7/2006 | Bryar et al. |
| 2006/0184421 A1 | 8/2006 | Lipsky et al. |
| 2006/0248442 A1 | 11/2006 | Rosenstein et al. |
| 2006/0277167 A1 | 12/2006 | Gross et al. |
| 2006/0294461 A1 | 12/2006 | Nadamoto et al. |
| 2007/0022072 A1 | 1/2007 | Kao et al. |
| 2007/0027672 A1 | 2/2007 | Decary et al. |
| 2007/0094241 A1 | 4/2007 | Blackwell et al. |
| 2007/0124693 A1 | 5/2007 | Dominowska et al. |
| 2007/0139430 A1 | 6/2007 | Korn et al. |
| 2007/0240160 A1 | 10/2007 | Paterson-Jones et al. |
| 2007/0288589 A1 | 12/2007 | Chen et al. |
| 2008/0028334 A1 | 1/2008 | De Mes |
| 2008/0104502 A1 | 5/2008 | Olston |
| 2008/0183672 A1 | 7/2008 | Canon et al. |
| 2008/0183889 A1* | 7/2008 | Andreev et al. ............... 709/238 |
| 2008/0184128 A1 | 7/2008 | Swenson et al. |
| 2008/0222299 A1* | 9/2008 | Boodaei ....................... 709/229 |
| 2008/0320225 A1 | 12/2008 | Panzer et al. |
| 2009/0012969 A1 | 1/2009 | Rail et al. |
| 2009/0100345 A1 | 4/2009 | Miller |
| 2009/0103470 A1 | 4/2009 | Candelore |
| 2009/0132640 A1 | 5/2009 | Verma et al. |
| 2009/0150343 A1 | 6/2009 | English et al. |
| 2009/0164597 A1 | 6/2009 | Shuster |
| 2009/0164924 A1 | 6/2009 | Flake et al. |
| 2009/0172781 A1 | 7/2009 | Masuoka et al. |
| 2009/0187819 A1 | 7/2009 | Bonefas et al. |
| 2009/0198618 A1 | 8/2009 | Chan et al. |
| 2009/0204478 A1 | 8/2009 | Kaib et al. |
| 2009/0204964 A1 | 8/2009 | Foley et al. |
| 2009/0217199 A1 | 8/2009 | Hara et al. |
| 2009/0240717 A1 | 9/2009 | Mimatsu |
| 2009/0241191 A1 | 9/2009 | Keromytis et al. |
| 2009/0248680 A1 | 10/2009 | Kalavade |
| 2009/0254867 A1 | 10/2009 | Farouki et al. |
| 2009/0276488 A1 | 11/2009 | Alstad |
| 2009/0282021 A1 | 11/2009 | Bennett |
| 2009/0287659 A1 | 11/2009 | Bennett |
| 2009/0287698 A1 | 11/2009 | Marmaros et al. |
| 2009/0327517 A1 | 12/2009 | Sivasubramanian et al. |
| 2009/0327914 A1 | 12/2009 | Adar et al. |
| 2010/0005394 A1 | 1/2010 | Dubnov |
| 2010/0017704 A1 | 1/2010 | Jaffe et al. |
| 2010/0017880 A1 | 1/2010 | Masood |
| 2010/0027552 A1 | 2/2010 | Hill |
| 2010/0031028 A1 | 2/2010 | Adams et al. |
| 2010/0036740 A1 | 2/2010 | Barashi |
| 2010/0042724 A1 | 2/2010 | Jeon et al. |
| 2010/0048296 A1 | 2/2010 | Adiraju |
| 2010/0050201 A1 | 2/2010 | Kubota et al. |
| 2010/0057639 A1 | 3/2010 | Schwarz et al. |
| 2010/0070569 A1 | 3/2010 | Turakhia |
| 2010/0070849 A1 | 3/2010 | Sadan et al. |
| 2010/0088404 A1 | 4/2010 | Mani et al. |
| 2010/0115126 A1 | 5/2010 | Kanakadandi et al. |
| 2010/0125507 A1 | 5/2010 | Tarantino, III et al. |
| 2010/0131594 A1 | 5/2010 | Kashimoto |
| 2010/0131646 A1 | 5/2010 | Drako |
| 2010/0135473 A1 | 6/2010 | Dewing et al. |
| 2010/0138293 A1 | 6/2010 | Ramer et al. |
| 2010/0138534 A1* | 6/2010 | Mutnuru et al. ............... 709/224 |
| 2010/0144314 A1 | 6/2010 | Sherkin et al. |
| 2010/0145902 A1 | 6/2010 | Boyan et al. |
| 2010/0185864 A1 | 7/2010 | Gerdes et al. |
| 2010/0191544 A1 | 7/2010 | Bosworth et al. |
| 2010/0198742 A1 | 8/2010 | Chang et al. |
| 2010/0218106 A1 | 8/2010 | Chen et al. |
| 2010/0223470 A1 | 9/2010 | Lord et al. |
| 2010/0235473 A1 | 9/2010 | Koren et al. |
| 2010/0278453 A1 | 11/2010 | King |
| 2010/0281112 A1 | 11/2010 | Plamondon |
| 2010/0293190 A1 | 11/2010 | Kaiser et al. |
| 2010/0312750 A1 | 12/2010 | Moore et al. |
| 2010/0312788 A1 | 12/2010 | Bailey |
| 2010/0313149 A1 | 12/2010 | Zhang et al. |
| 2010/0318892 A1 | 12/2010 | Teevan et al. |
| 2010/0325239 A1 | 12/2010 | Khedouri et al. |
| 2010/0325287 A1 | 12/2010 | Jagadeeswaran et al. |
| 2010/0332513 A1 | 12/2010 | Azar et al. |
| 2011/0010762 A1 | 1/2011 | Nijdam et al. |
| 2011/0022957 A1 | 1/2011 | Lee |
| 2011/0029854 A1 | 2/2011 | Nashi et al. |
| 2011/0055203 A1 | 3/2011 | Gutt et al. |
| 2011/0055398 A1 | 3/2011 | DeHaan et al. |
| 2011/0066982 A1 | 3/2011 | Paulsami et al. |
| 2011/0072502 A1 | 3/2011 | Song et al. |
| 2011/0078140 A1 | 3/2011 | Dube et al. |
| 2011/0078705 A1 | 3/2011 | Maclinovsky et al. |
| 2011/0119352 A1 | 5/2011 | Perov |
| 2011/0119374 A1 | 5/2011 | Ruhl et al. |
| 2011/0119661 A1 | 5/2011 | Agrawal et al. |
| 2011/0126296 A1 | 5/2011 | Moore |
| 2011/0154028 A1 | 6/2011 | Kirkup et al. |
| 2011/0161849 A1 | 6/2011 | Stallings et al. |
| 2011/0167156 A1 | 7/2011 | Mani et al. |
| 2011/0173177 A1 | 7/2011 | Junqueira et al. |
| 2011/0173637 A1 | 7/2011 | Brandwine et al. |
| 2011/0178868 A1 | 7/2011 | Garg et al. |
| 2011/0185025 A1 | 7/2011 | Cherukuri et al. |
| 2011/0191327 A1 | 8/2011 | Lee |
| 2011/0197121 A1 | 8/2011 | Kletter |
| 2011/0202848 A1 | 8/2011 | Ismalon |
| 2011/0208822 A1 | 8/2011 | Rathod |
| 2011/0208840 A1 | 8/2011 | Blackman |
| 2011/0212717 A1 | 9/2011 | Rhoads et al. |
| 2011/0213966 A1 | 9/2011 | Fu et al. |
| 2011/0214082 A1 | 9/2011 | Osterhout et al. |
| 2011/0219448 A1 | 9/2011 | Sreedharan et al. |
| 2011/0231555 A1* | 9/2011 | Ebrahimi et al. ............. 709/226 |
| 2011/0246638 A1* | 10/2011 | Smith ................... H04L 41/069 709/224 |
| 2011/0246873 A1 | 10/2011 | Tolle et al. |
| 2011/0249074 A1 | 10/2011 | Cranfill et al. |
| 2011/0256889 A1 | 10/2011 | Polis et al. |
| 2011/0261828 A1 | 10/2011 | Smith |
| 2011/0264649 A1 | 10/2011 | Hsiao et al. |
| 2011/0282997 A1 | 11/2011 | Prince et al. |
| 2011/0289074 A1 | 11/2011 | Leban |
| 2011/0289157 A1 | 11/2011 | Pirnazar |
| 2011/0296341 A1 | 12/2011 | Koppert |
| 2011/0296503 A1 | 12/2011 | Shull et al. |
| 2011/0302510 A1 | 12/2011 | Harrison et al. |
| 2011/0314154 A1 | 12/2011 | Resch et al. |
| 2011/0320598 A1 | 12/2011 | Solin |
| 2011/0321100 A1 | 12/2011 | Tofighbakhsh |
| 2011/0321139 A1 | 12/2011 | Jayaraman et al. |
| 2012/0005258 A1 | 1/2012 | Cok et al. |
| 2012/0005276 A1 | 1/2012 | Guo et al. |
| 2012/0005600 A1 | 1/2012 | Ito |
| 2012/0022942 A1 | 1/2012 | Holloway et al. |
| 2012/0023487 A1 | 1/2012 | Letca et al. |
| 2012/0030460 A1 | 2/2012 | Chang |
| 2012/0047449 A1 | 2/2012 | Buckart et al. |
| 2012/0054316 A1 | 3/2012 | Piazza et al. |
| 2012/0054869 A1 | 3/2012 | Yen et al. |
| 2012/0066502 A1 | 3/2012 | Borneman et al. |
| 2012/0066586 A1 | 3/2012 | Shemesh |
| 2012/0072821 A1 | 3/2012 | Bowling |
| 2012/0084433 A1 | 4/2012 | Bar-Caspi et al. |
| 2012/0084644 A1 | 4/2012 | Robert et al. |
| 2012/0096269 A1 | 4/2012 | McAlister |
| 2012/0096365 A1 | 4/2012 | Wilkinson et al. |
| 2012/0110017 A1 | 5/2012 | Gu et al. |
| 2012/0117565 A1 | 5/2012 | Staelin et al. |
| 2012/0117649 A1 | 5/2012 | Holloway et al. |
| 2012/0137201 A1 | 5/2012 | White et al. |
| 2012/0143944 A1 | 6/2012 | Reeves et al. |
| 2012/0144288 A1 | 6/2012 | Caruso et al. |
| 2012/0150844 A1 | 6/2012 | Lindahl et al. |
| 2012/0158694 A1 | 6/2012 | Skrenta et al. |
| 2012/0166526 A1 | 6/2012 | Ambardekar |

(56) References Cited

U.S. PATENT DOCUMENTS

| | | |
|---|---|---|
| 2012/0166922 A1 | 6/2012 | Rolles |
| 2012/0192220 A1 | 7/2012 | Wyatt et al. |
| 2012/0198020 A1 | 8/2012 | Parker et al. |
| 2012/0198516 A1 | 8/2012 | Lim |
| 2012/0203904 A1 | 8/2012 | Niemela et al. |
| 2012/0206317 A1 | 8/2012 | Wong et al. |
| 2012/0210233 A1 | 8/2012 | Davis et al. |
| 2012/0215833 A1 | 8/2012 | Chen et al. |
| 2012/0215834 A1 | 8/2012 | Chen et al. |
| 2012/0215919 A1 | 8/2012 | Labat et al. |
| 2012/0216035 A1 | 8/2012 | Leggette et al. |
| 2012/0254402 A1 | 10/2012 | Panidepu et al. |
| 2012/0284629 A1 | 11/2012 | Peters et al. |
| 2012/0290348 A1 | 11/2012 | Hackett et al. |
| 2012/0297341 A1 | 11/2012 | Glazer et al. |
| 2012/0317236 A1* | 12/2012 | Abdo et al. ............... 709/219 |
| 2012/0317295 A1 | 12/2012 | Baird et al. |
| 2012/0324043 A1 | 12/2012 | Burkard et al. |
| 2012/0331406 A1 | 12/2012 | Baird et al. |
| 2013/0007101 A1 | 1/2013 | Trahan et al. |
| 2013/0007102 A1 | 1/2013 | Trahan et al. |
| 2013/0031461 A1 | 1/2013 | Hou et al. |
| 2013/0046878 A1 | 2/2013 | Fryc et al. |
| 2013/0051686 A1 | 2/2013 | Bennett |
| 2013/0073388 A1 | 3/2013 | Heath |
| 2013/0080611 A1 | 3/2013 | Li et al. |
| 2013/0086261 A1* | 4/2013 | Lim ............... G06F 17/3089 709/224 |
| 2013/0091350 A1* | 4/2013 | Gluck ............ H04L 63/0281 713/153 |
| 2013/0097380 A1 | 4/2013 | Colgrove et al. |
| 2013/0097494 A1 | 4/2013 | St. Jacques et al. |
| 2013/0103785 A1 | 4/2013 | Lyon |
| 2013/0111579 A1 | 5/2013 | Newman et al. |
| 2013/0165238 A1 | 6/2013 | Batista Jerez |
| 2013/0185715 A1 | 7/2013 | Dunning et al. |
| 2013/0198641 A1 | 8/2013 | Brownlow et al. |
| 2013/0198823 A1 | 8/2013 | Hitchcock et al. |
| 2013/0202150 A1 | 8/2013 | Sinha et al. |
| 2013/0318354 A1 | 11/2013 | Entschew et al. |
| 2014/0006129 A1 | 1/2014 | Heath |
| 2014/0344660 A1 | 11/2014 | Hayden |

OTHER PUBLICATIONS

EyeBrowse: Record, Visualize and Share your Browser History, Information Aesthetics, Sep. 18, 2009, 2 pages, printed on Jan. 25, 2013.
Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.
Gabber, et al., "How to Make Personalized Web Browsing Simple, Secure, and Anonymous," Financial Cryptography, 16 pages (1997).
Gingerich, Jason, "Keycorp Making Site Into Portal," KRTBN Knight-Ridder Tribune Business News (South Bend Tribune, Indiana), Oct. 25, 1999, 2 pages.
Hopper, D. Ian, "Desktops Now Have Power to Comparison-Shop," Oct. 18, 1999, printed from http://www.cnn.com/TECH/computing/9910/18/r.u.sure/index.html, 3 pages.
Van Kleek, M., Introducing "Eyebrowse"—Track and share your web browsing in real time, Haystack Blog, Aug. 28, 2009, 3 pages, printed on Jan. 25, 2013.
Web page titled "RSS Ticker: Add-ons for Firefox," https://addons.mozilla.org/en-US/firefox/addon/rss-ticker/, 3 printed pages, printed on Feb. 7, 2013.
Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.
Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.
De Carvalho, L.G., et al., Synchronizing Web Browsing Data With Browserver, Proceedings of the IEEE Symposium on Computers and Communications, Jun. 22-25, 2010, Riccione, Italy, pp. 738-743.
Close 'n' Forget Firefox add on, Evilfantasy's blog, http://evilfantasy.wordpress.com/2009/03/24/dose-%E2%80%98n%E2%80%99-forget-firefox-add-on/, retrieved Mar. 24, 2009, 1 page.
Rao, H.C.-H., et al., "A Proxy-Based Personal Web Archiving Service," Operating Systems Review, 35(1):61-72, 2001.
Teevan, J., et al., "Changing How People View Changes on the Web," 2009, Proceedings of the $22^{nd}$ Annual ACM Symposium on User Interface Software and Technology, New York, 2009, pp. 237-246.
Acharya et al., Balancing Push and Pull for Data Broadcast, Proceedings of ACM SIGMOD Conference, May 1997, pp. 1-12, Tucson, AZ.
Acharya et al., Prefetching from a Broadcast Disk, Proceedings of the International Conference on Data Engineering, Feb. 1996, New Orleans, LA.
Amazon Gives Virtual Private Clouds Internet Access, available at http://web2.sys-con.com/node/1759023/, Mar. 2011.
Anderson et al., Interposed Request Routing for Scalable Network Storage; OSDI Proceedings 2000; Dept. Computerscience; Duke University.
Bestavros et al., Server-initiated Document Dissemination for the WWW, IEEE Data Engineering Bulletin, Sep. 1996, vol. 19, Issue 3, pp. 3-11, Boston, MA.
Brooks et al., Application-Specific Proxy Servers as HTTP Stream Transducers, Dec. 1995, pp. 1-7.
Chinen et al., An Interactive Prefetching Proxy Server for Improvement of WWW Latency, Jun. 1997, pp. 1-10.
Curewitz et al., Practical Prefetching via Data Compression, SIGMOD Conference, 1993, pp. 10, San Diego, CA.
Dias et al., A Smart Internet Caching System, 1996, pp. 1-12, Moratuwa, Sri Lanka.
Franklin et al., Dissemination-Based Information Systems, IEEE Data Engineering Bulletin, Sep. 1996, vol. 19, Issue 3, pp. 1-9.
Gingerich, Jason, Keycorp Making Site Into Portal: Keycorp, South Bend Tribune, Ind., Apr. 9, 2009, 2 pages.
Gulbrandsen et al., A DNS RR for specifying the location of services (DNS SRV), RFC 2782, 12 pages, Feb. 2000.
Inoue et al., An Adaptive WWW Cache Mechanism in the AI3 Network, 1997, pp. 1-9.
Kumar, Vijay, et al, Metadata Visualization for Digital Libraries: Interactive Timeline Editing and Review, Proceedings of the Third ACM Conference on Digital Libraries, ACM, 1998, pp. 126-133.
Lubonski et al., An Adaptation Architecture to Improve User-Perceived QoS of Multimedia Services for Enterprise Remote Desktop Protocols. NG12005, pp. 149-156.
Malik et al., Virtual Cloud: Rent Out the Rented Resources, 6th International Conference on Internet Technology and Secured Transactions, Dec. 2011.
Mockapetris, Domain Names—Implementation and Specification, RFC 1035, 55 pages, Nov. 1987.
Monroy, Carlos, et al, Interactive Timeline Viewer (ItLv): A Tool to Visualize Variants Among Documents, Visual Interfaces to Digital Libraries, Springer Berlin Heidelberg, 2002, pp. 1-11.
Opera Mini, http://en.wikipedia.org/wiki/Opera_mini, last modified on Mar. 7, 2013 at 10:31.
Padmanabhan et al., Using Predictive Prefetching to Improve World Wide Web Latency, Computer Communication Review, 1996, vol. 26, pp. 22-36.
Shrikumar et al., Thinternet: Life at the End of a Tether, 1994, vol. 222-09.
Sullivan, Danny, Google Search History Expands, Becomes Web History, http://searchengineland.com/google-search-history-expands-becomes-web-history-11016, Apr. 19, 2007, 12 pages.
Wang et al., Prefetching in World Wide Web, Department of Computer Science, University College London, Nov. 18-22, 1996, London, UK.

* cited by examiner

REMOTE BROWSING SESSION MANAGEMENT

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the Web page as well as the data associated with the embedded resources.

Once the client computing device obtains the Web page and associated additional resources, the content may be processed in a number of stages by the software browser application or other client computing device interface. For example, and with reference to the above illustration, the software browser application may parse the Web page to process various HTML layout information and references to associated resources, may identify and process Cascading Style Sheets ("CSS") information, may process and instantiate various Javascript code associated with the Web page, may construct a native object model to represent one or more components of the Web page, and may calculate various layout and display properties of the processed content for presentation to a user.

From the perspective of a user utilizing a client computing device, a user experience can be defined in terms of the performance and latencies associated with obtaining network content over a communication network, such as obtaining a Web page, processing embedded resource identifiers, generating requests to obtain embedded resources, and rendering content on the client computing device. Latencies and performance limitations of any of the above processes may diminish the user experience. Additionally, latencies and inefficiencies may be especially apparent on computing devices with limited resources, such as processing power, memory or network connectivity such as netbooks, tablets, smartphones, and the like.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
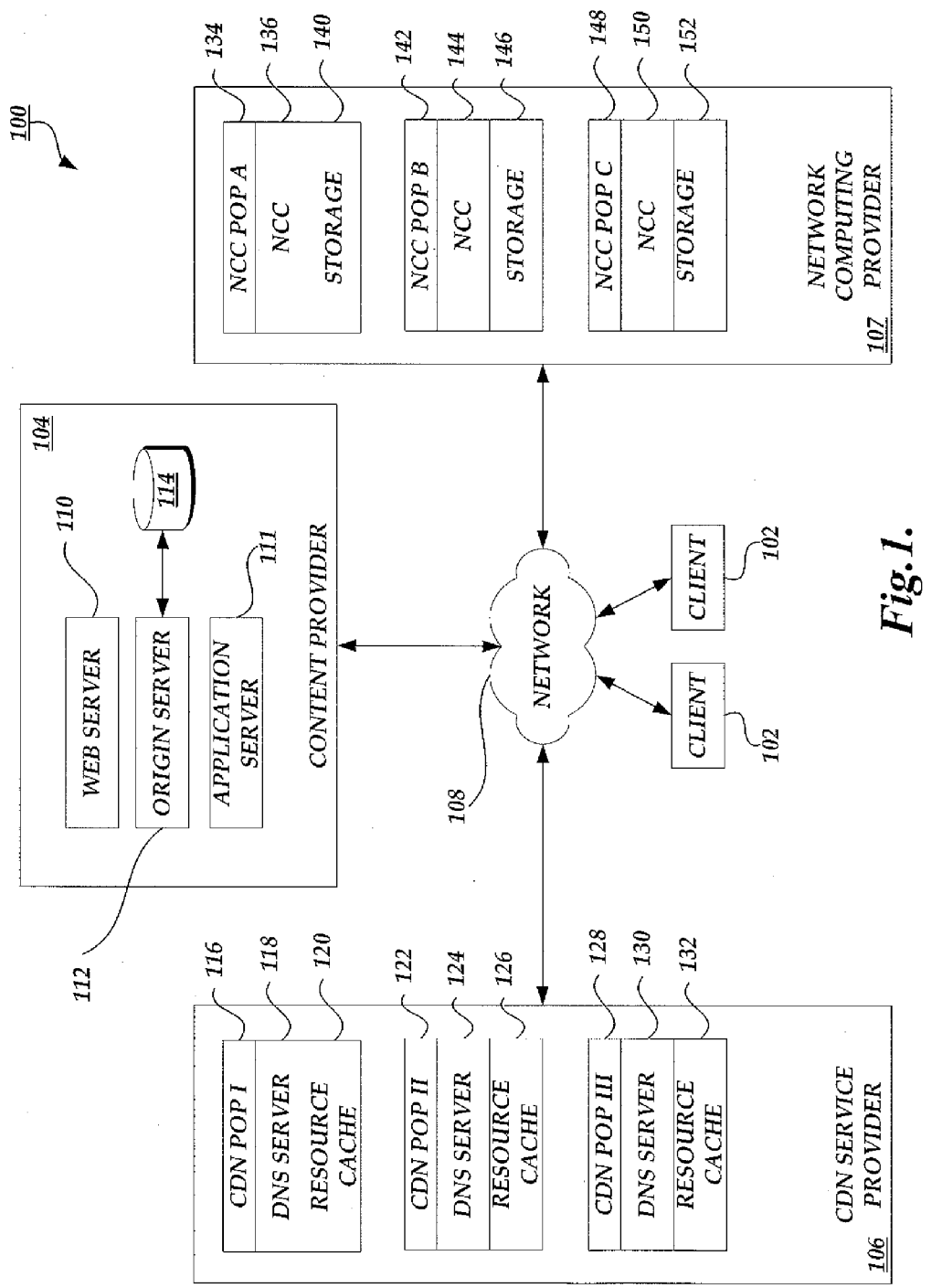
FIG. 1 is a block diagram illustrative of a content delivery environment including a number of client computing devices, content provider, a content delivery network service provider, and a network computing provider.

Generally described, the present disclosure is directed to the generation and management of a remote application session between client computing devices and content providers in conjunction with a network computing provider. Specifically, aspects of the disclosure will be described with regard to the request for a browse session by a client computing device with a content provider, the establishment of a remote browse session between the client computing device and a network computing provider, and the transmission of browse session state data and client interaction data between the client computing device and the network computing provider. The network computing provider can remove information from the request that may be used to identify the client computing device or its end user before passing the request to a content provider. Then network computing provider can also remove information from the content provider's response that may be used to identify the client computing device or its end user before passing the response to the client computing device.

Although aspects of the embodiments described in the disclosure will focus, for the purpose of illustration, on the management of a remote browse session, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load a software browser application (henceforth referred to as a "browser") for accessing content provided by one or more content providers. Illustratively, the accessed content may include a collection of one or more network resources (e.g., a Web page) and embedded resources such as images, video, audio, text, executable code, and other resources. In one embodiment, the browser may have a content display area or pane for displaying the accessed network content in addition to one or more local interface components, such as toolbars, menus, buttons, or other user interface controls. Local interface components may be managed and controlled by the software browser application or any other process executing or implemented locally at the client computing device. Illustratively, managing user interface controls locally may allow for a responsive user interface, as interactions by the user are processed locally on the client computing device.

Subsequent to the browser being loaded, a user or automated browser process may cause the client computing device to transmit a request to access content from a content provider by establishing a browse session with a network computing provider across a private or public network. The browse session request may include information identifying one or more sources for the requested content. The identifiers can be in the form of network addresses of network resources, such as a Web site or other network accessible piece of content. For example, the user may select or enter a URL, (e.g., http://www.xyzwebsite.com) into a browser window, causing the client computing device to transmit a request for a new browse session to the network computing provider, including the selected URL. The address or location of a network computing provider capable to service the browse session request may be hardcoded into the browser, may be configurable by the user, may be obtained from a network address service, or may be determined in any other way.

The browse session request, and any subsequent resource requests, may also include identification information about the client computing device. The identification information can include the IP address or MAC address of the client computing device, cookies stored on the client computing device, and various HTTP headers containing information about the client computing device.

In an illustrative embodiment, responsive to the browse session request received from the client computing device, the network computing provider may instantiate or cause to have instantiated one or more computing components associated with the network computing provider that will host a browser software application. For example, the network computing provider can instantiate, or cause to have instantiated, an instance of a virtual machine that includes a software browser application capable of requesting resources from a communication network. Illustratively, in some situations, one or more devices associated with the network computing provider may be located in a data center or other robustly networked computing environment, and, as compared to the client computing device, may experience relatively little latency or delay when obtaining network resources.

Prior to retrieving the requested network resource(s), the network computing component can remove from the request some or all of the information identifying the client computing device. Using the instantiated network computing components, the network computing provider may request the identified network resource(s) from one or more content providers, a content delivery network, or a local or associated cache component. For example, the browser software application on the instantiated network computing component can process a primary network resource and then generate additional content requests for content identified in one or more embedded resource identifiers (e.g. pictures, video files, etc.). Illustratively, in the case of other, non-browser, applications, network resources, or content may include any file type or format known in the art and supported by the specific software application.

Having obtained a response from the content provider that includes the requested content (e.g., the requested network resource and embedded resources), the network computing provider may remove from the response any information that was added to facilitate identification of the client computing device or its end user. The network computing provider can then identify a remote session browsing configuration specifying a remote session communication protocol for use in transmitting the requested content, user interaction data, intermediate processing results, and other information between the browser being executed on the client computing device and the browser being executed at the instantiated network computing component on the computing provider. The information exchanged between the browser on the instantiated network computing component and the browser on the client computing device can be generally referred to as "browser session information."

FIG. 1 is a block diagram illustrative of a networked computing environment 100 for the management and processing of content requests. As illustrated in FIG. 1, the networked computing environment 100 includes a number of client computing devices 102 (generally referred to as clients) for requesting content and content processing from a content provider 104, CDN service provider 106, or network computing provider 107. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing provider 107, etc.) via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the networked computing environment 100 can further include a CDN service provider 106 in communication with the one or more client computing devices 102 and other service providers via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1, the networked computing environment 100 can also include a network computing provider 107 in communication with the one or more client computing devices 102, the CDN service provider 106, and the content provider 104 via the communication network 108. The network computing provider 107 illustrated in FIG. 1 also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing provider 107 may maintain separate POPs for providing the NCC and the storage components. Additionally, although the NCC POPs 134, 142, 148 are illustrated in FIG. 1 as logically associated with a network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 and components of the CDN service provider 106 can be managed by the same or different entities.

With reference now to FIGS. 2-6, the interaction between various components of the networked computing environment 100 of FIG. 1 will be illustrated. Specifically, FIGS. 2A, 3A, 4A, 5A and 6A ("FIGS. 2A-6A") illustrate the interaction between various components of the networked computing environment 100 for the exchange of content between a client computing device 102 and a content provider 104 via the network computing provider 107. FIGS. 2B, 3B, 4B, 5B, and -6B ("FIGS. 2B-6B") illustrate the exchange of identification data between the various components of the networked computing environment 100. Illustratively, the interaction illustrated in FIGS. 2B-6B can occur simultaneously with the interaction illustrated in FIGS. 2A-6A. For example, the interactions illustrated in FIGS. 2A-6A facilitate the exchange of content between the content providers 104, CDN service providers 106, network computing providers 107 and the client computing devices 102. The exchanges illustrated in FIGS. 2B-6B can facilitate a high level of control over the transmission of potentially identifying data to third parties. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2A:
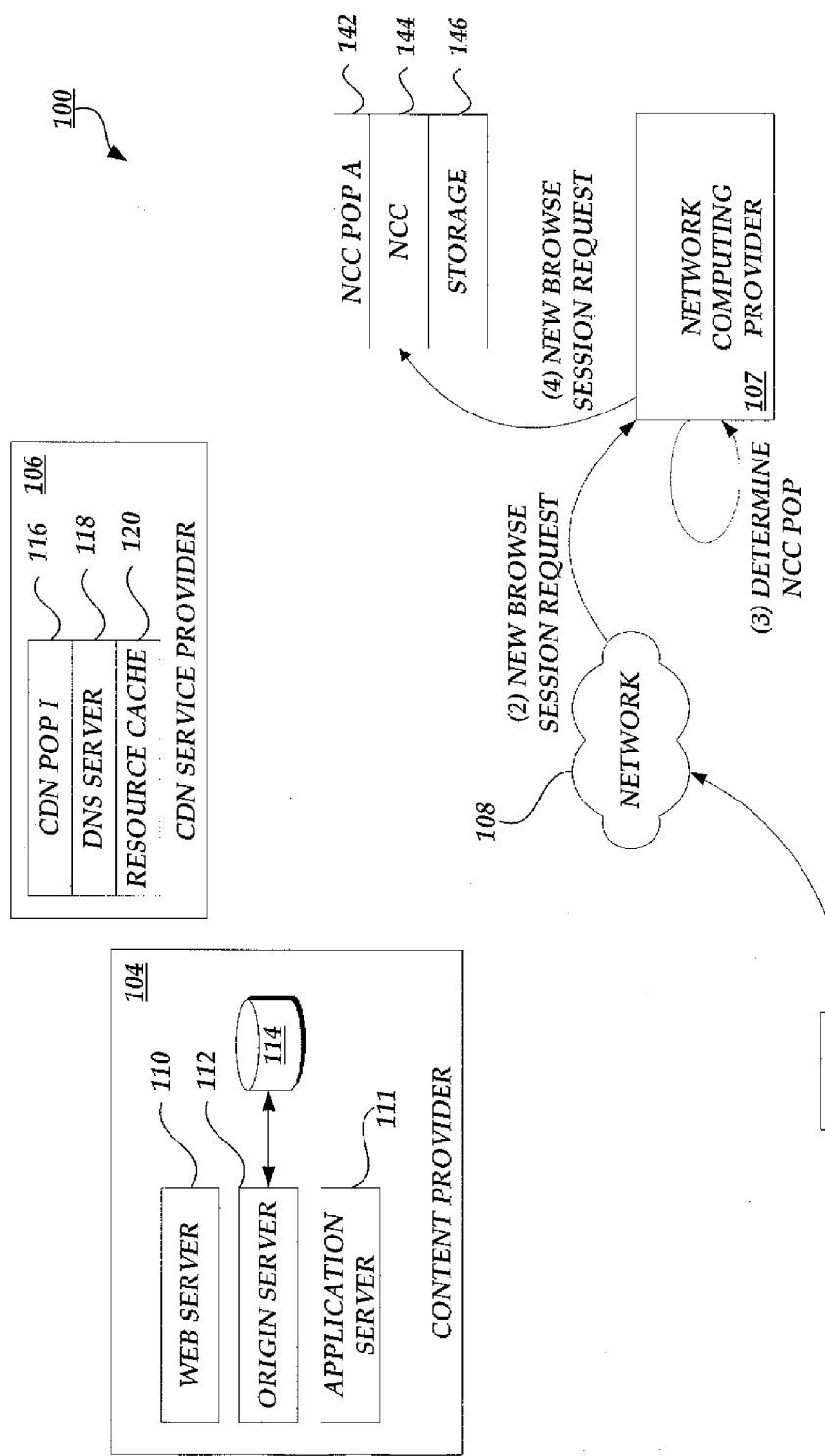
FIG. 2A is a block diagram of the content delivery environment of FIG. 1 illustrating the generation and processing of a new browse session request from a client computing device to a network computing provider.

With reference to FIG. 2A, the process can begin with the generation and processing of a browse session request from a client computing device 102 to a network computing provider 107 will be described. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2A, the browse session request is transmitted first to a network computing provider 107. In some embodiments, the browse session request or any other request can be transmitted over a secure connection that has been established between network computing provider 107 and the client computing device 102, for example an SSL connection. In some embodiments, the connection between the client computing device 102 and the network computing provider 107 can be a tunneled connection. In an illustrative embodiment, the network computing provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Figure 2B:
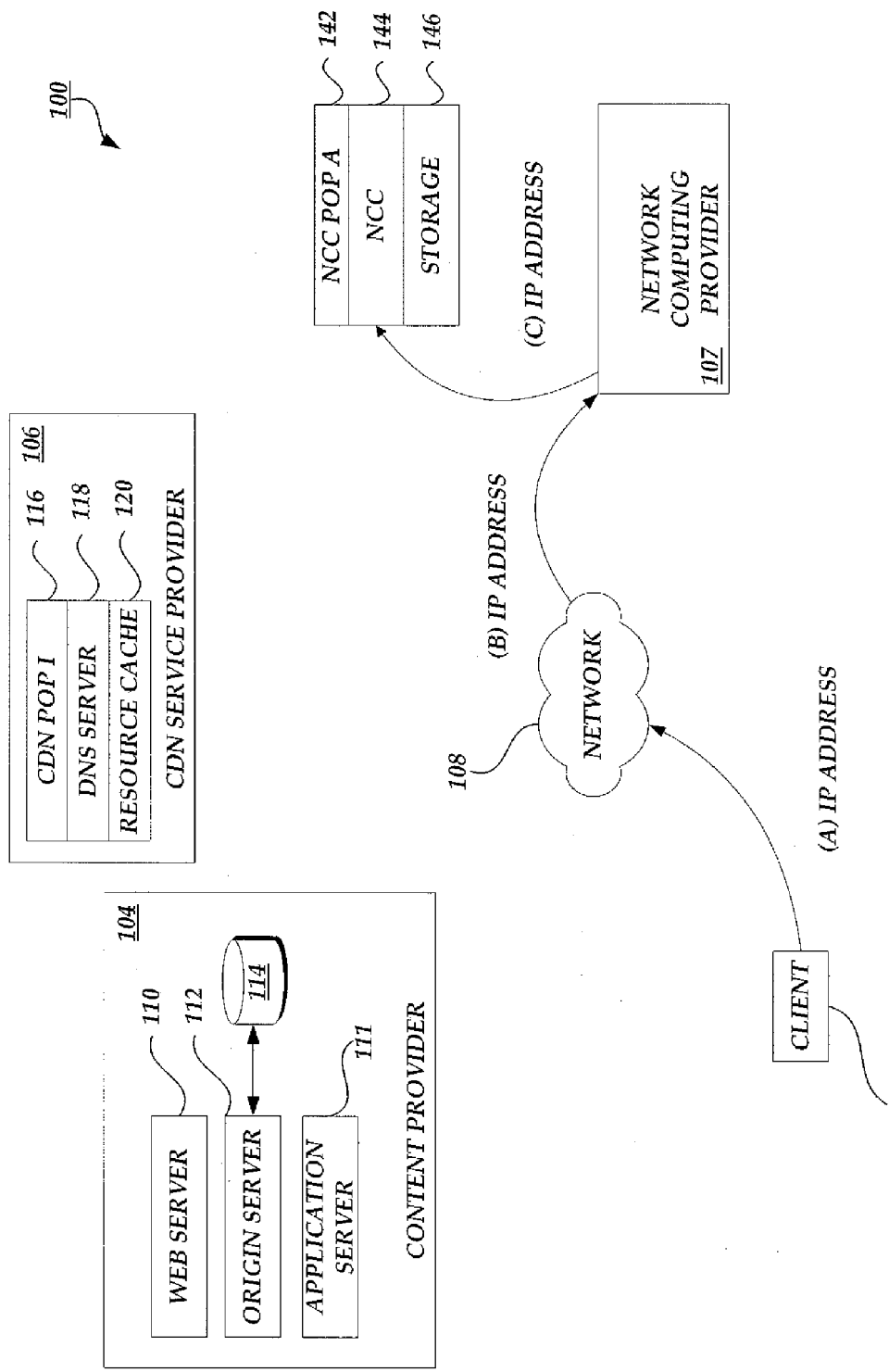
FIG. 2B is a block diagram of the content delivery environment of FIG. 1 illustrating the communication of identification-related data between a client computing device and a network computing provider.

As illustrated in FIG. 2B, a browse session request can also contain identification data that can be used to identify the client computing device 102 or end user of the client computing device 102. The identification data can include the IP address of the client computing device 102. In some embodiments, the identification data can include the MAC address of the client computing device 102 and/or any cookies that reside on the client computing device 102. In some embodiments, the identification data can include HTTP headers such user-agent, or any other HTTP header or other data field, including session-id, request-id, a unique browser identifier, and the like.

Returning to FIG. 2A, subsequent to the receipt of the browse session request, the network computing provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102. As illustrated in FIG. 2B, the identification data received with the browse session request can be passed to the NCC POP instance servicing the browse session request.

Figure 3A:
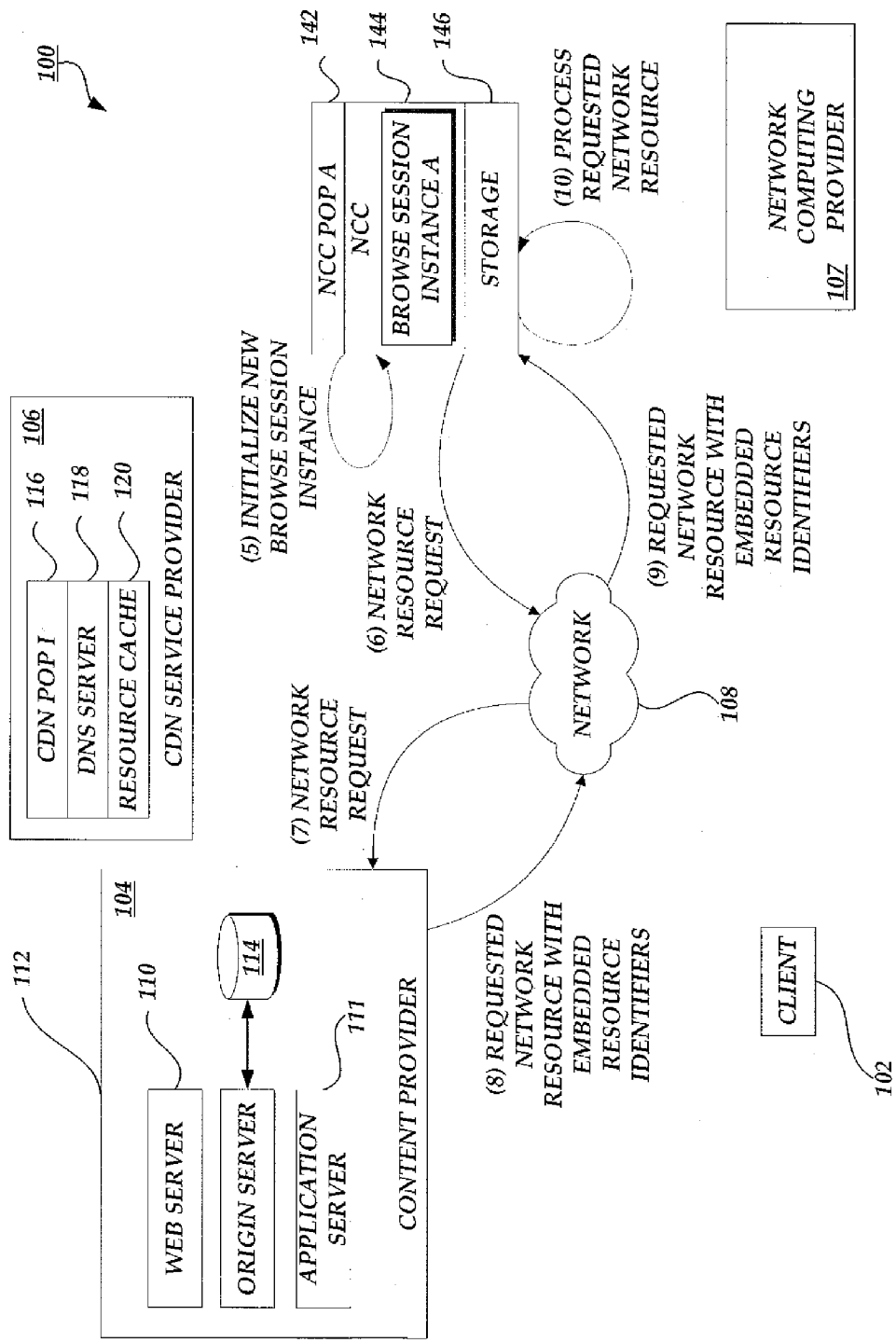
FIG. 3A is a block diagram of the content delivery environment of FIG. 1 illustrating the generation and processing of a request for a network resource from a network computing provider to a content provider.
Figure 3B:
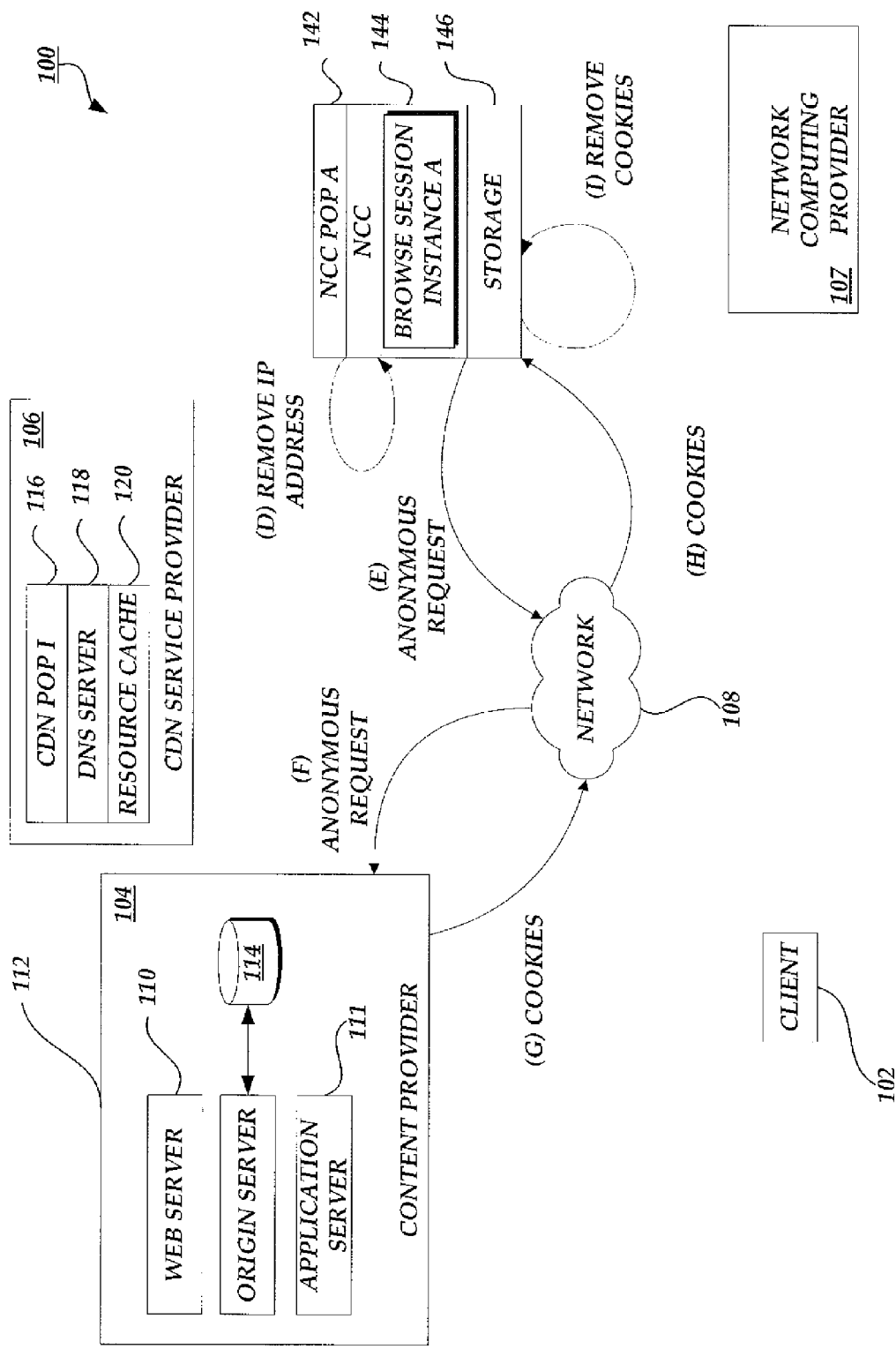
FIG. 3B is a block diagram of the content delivery environment of FIG. 1 illustrating the communication of identification-related data between a network computing provider and a content provider.

With reference to FIGS. 3A and 3B, an illustrative interaction for generation and processing of a request for a network resource from a network computing provider 107 to a content provider 104 will be described. As illustrated in FIG. 3A, the selected NCC POP 142 may generate a browse session corresponding to one or more content providers based on a browse session request, such as the illustrative browse session request depicted in FIG. 2A above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a Web page, such as "http://www.xyzsite.com/default.htm." NCC POP 142 may resolve the URL to an IP address through a DNS resolver associated with the network computing provider (not shown), and may request the Web page from the content provider 104 at the resolved IP address. In various embodiments, a network resource may be retrieved from any combination of content providers, content delivery network (hereinafter "CDN") servers, or caches associated with the network computing provider 107. For example, the network computing provider may check if a resource is stored in a local cache or in another server or service provider associated with the network computing provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3A, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

In some embodiments, the NCC POP 142 can make substantially anonymous requests for network resources on behalf of the client computing device 102. As illustrated in FIG. 3B, the NCC POP 142 can remove the IP address of the client computing device 102 from the request prior to transmitting the request for the resource to the content provider 104. Other potentially identifying information can be removed from the request as well, for example the MAC address, cookies, HTTP headers, and the like. The degree to which identifying information is removed from the request can be determined on a request-by-request basis so as to retrieve the resource most responsive to the request from the client computing device 102. For example, certain content providers 104 may require the IP address or some other geolocation indicator in order to adequately respond to the request, such as mapping and weather forecasting applications. When processing requests for resources from those content providers 104, the IP address of the client computing device 102 can remain in the request, while other identification information such as cookies can be removed. In other cases, all identifying information can be withheld even though the content provider 104 will specifically look for it, for example in certain advertisement serving applications.

Returning to FIG. 3A, subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a Web page may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a remote session browsing configuration as discussed below with reference to FIG. 4A.

As illustrated in FIG. 3B, the NCC POP 142 can inhibit or block attempts by the content provider 104 to identify the client computing device 102. For example, content providers 104 may return cookies in the response, along with requested network resource. The cookies can be used in subsequent requests to determine, for example, which resources the requestor has requested in the past. In some embodiments, the NCC POP 142 can be configured to remove these cookies from the response before it is transmitted to the client computing device 102. In some embodiments, the NCC POP 142 can be configured to retain the cookies on the NCC POP 142, in the browse session instance 144, in the storage 146, etc. Such a configuration can provide the end user of the client computing device 102 with the flexibility of having the cookies available for future requests if desired, without physically locating them on the client computing device 102. This configuration can also provide the end user with the flexibility of having the cookies available regardless of which client computing device 102 the end user is currently operating.

Figure 4A:
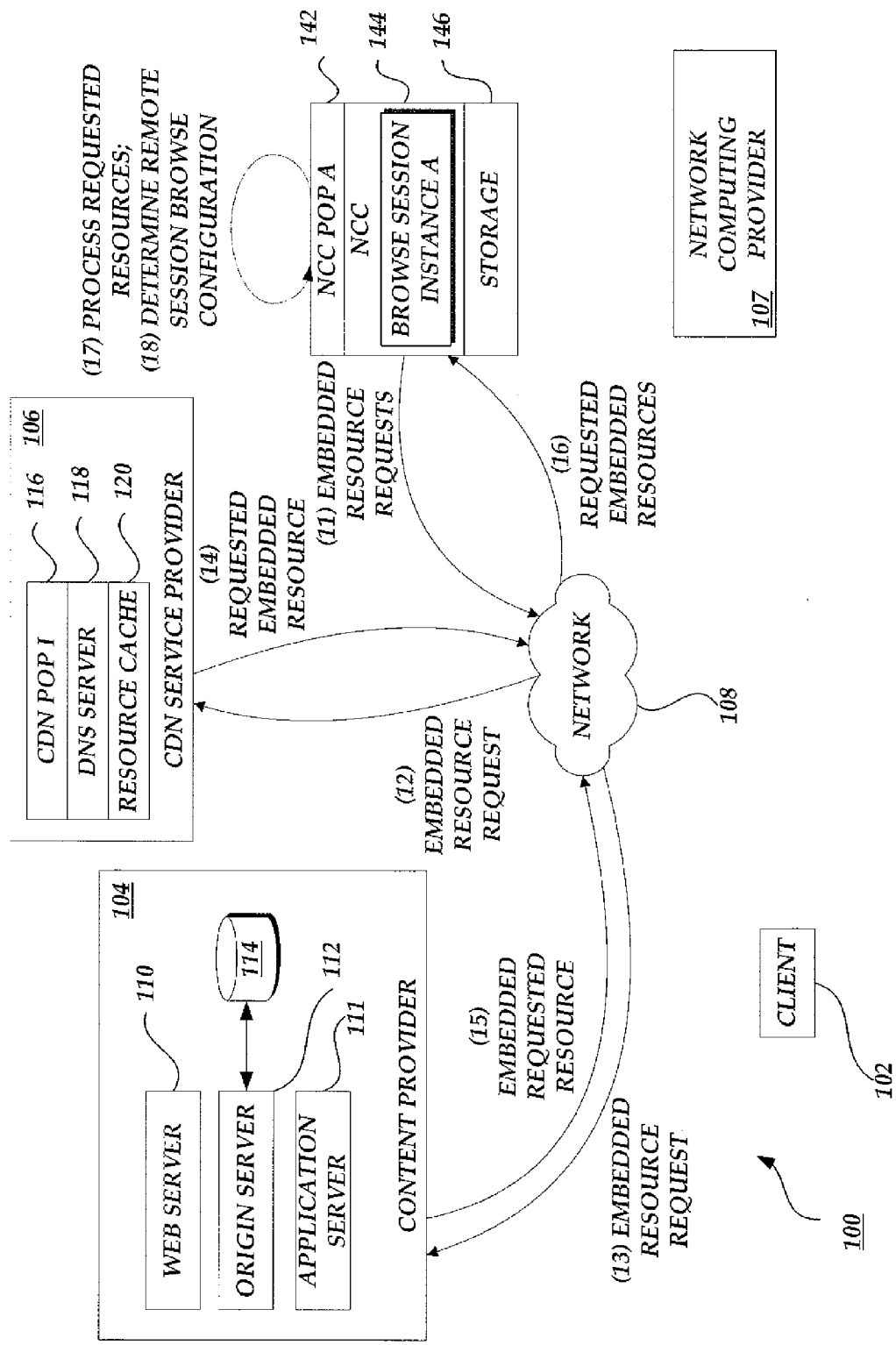
FIG. 4A is a block diagram of the content delivery environment of FIG. 1 illustrating the generation and processing of one or more requests corresponding to one or more embedded resources from a network computing provider to a content provider and content delivery network.
Figure 4B:
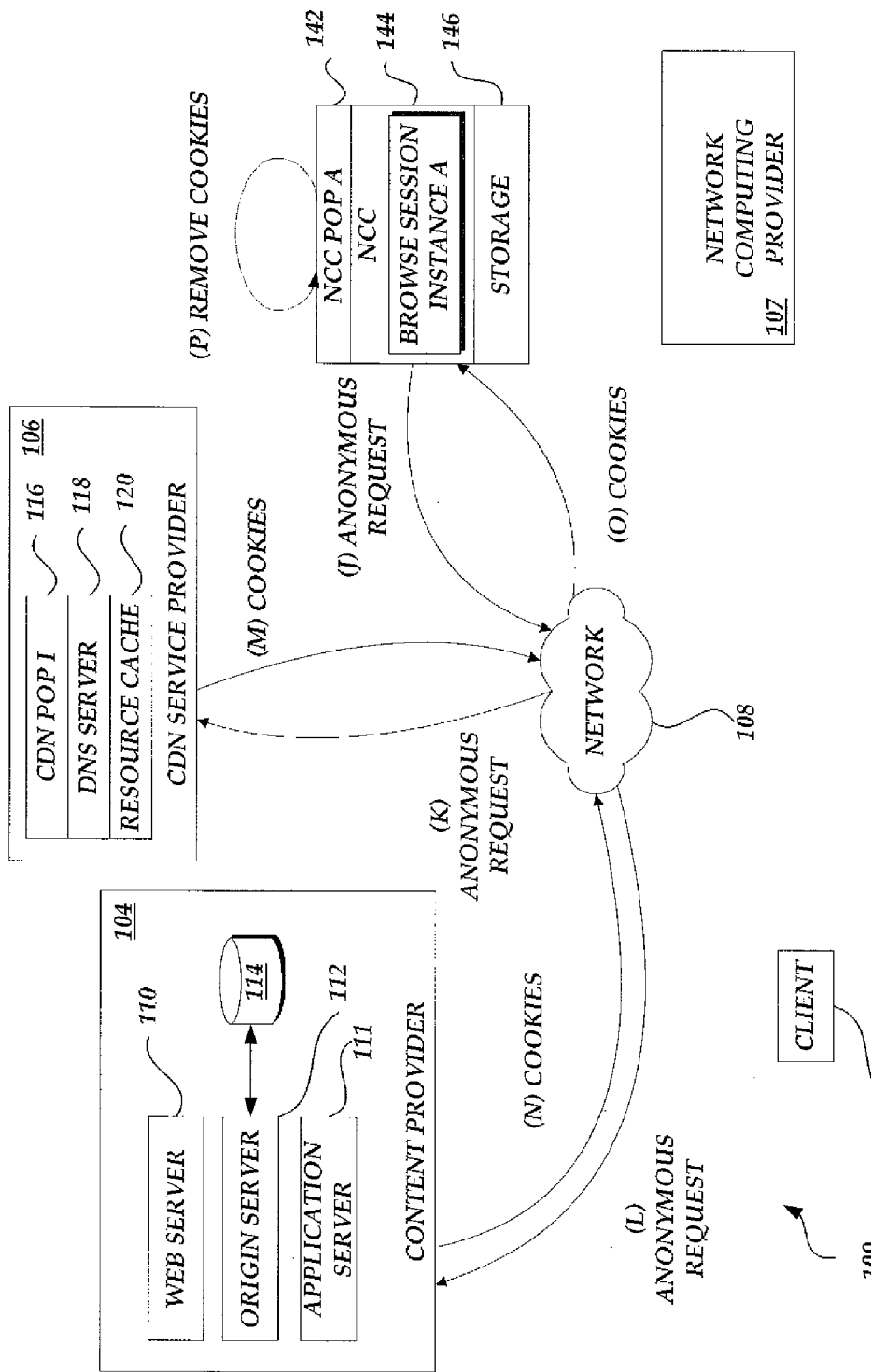
FIG. 4B is a block diagram of the content delivery environment of FIG. 1 illustrating the communication of identification-related data between a network computing provider and a content provider.

With reference to FIG. 4A, an illustrative interaction for generation and processing of one or more requests corresponding to one or more embedded resources from a network computing provider to a content provider and content delivery network is disclosed. As illustrated in FIG. 4A, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3A above. In various embodiments, embedded resources may be retrieved from any combination of content providers, CDN servers, or caches associated with the network computing provider 107. For example, the network computing provider may check if an embedded resource is stored in a local cache or in another server or service provider associated with the network computing provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102. As illustrated in FIG. 4B, the NCC POP 142 can perform similar operations regarding identification data during the request, receipt, and processing of the embedded resources as it performed during the request, receipt, and processing of the original network resource.

Figure 5A:
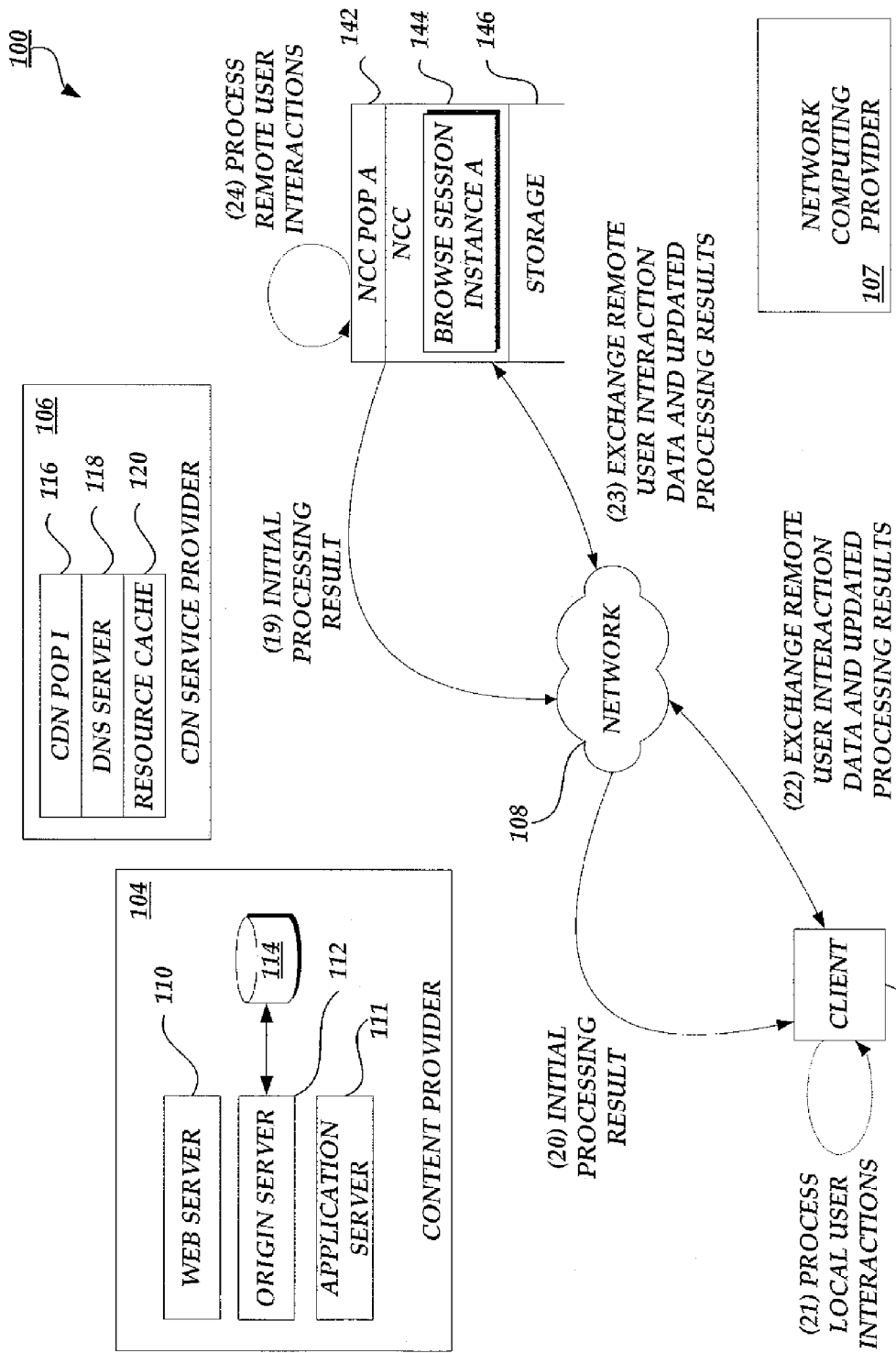
FIG. 5A is a block diagram of the content delivery environment of FIG. 1 illustrating the generation and processing of browse session data and user interaction data between a network computing provider and client computing device.
Figure 5B:
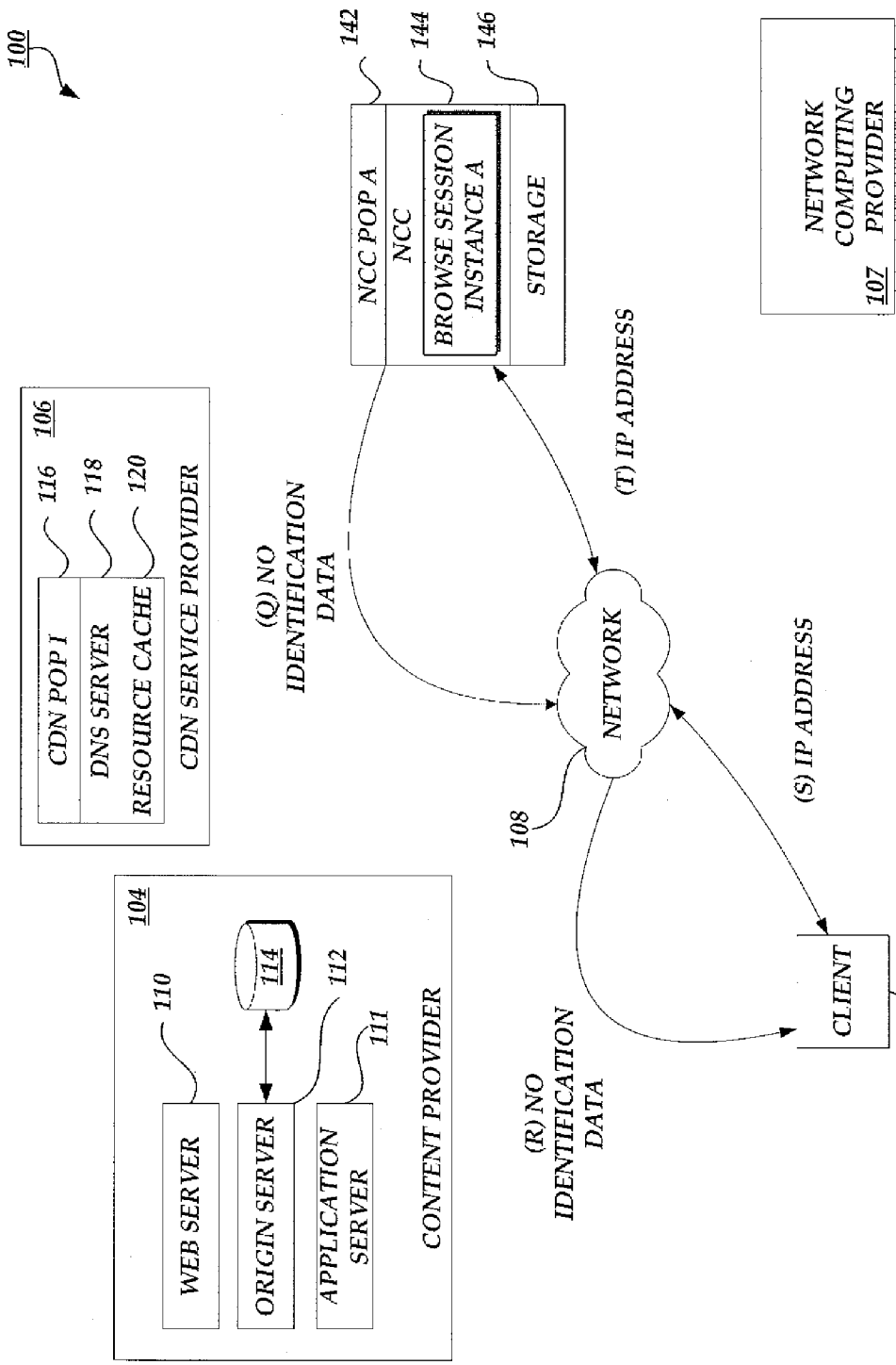
FIG. 5B is a block diagram of the content delivery environment of FIG. 1 illustrating the communication of identification-related data between a network computing provider and a client computing device.

With reference to FIG. 5A, an illustrative interaction for generation and processing of processing results and user interaction data between a network computing provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5A, the selected NCC POP 142 may provide an initial processing result to the client computing device 102 over the network 108. The initial processing result may correspond to requested network content, such as a Web page, along with associated embedded resources processed by the NCC POP 142 in accordance with a selected remote session browsing configuration as described in FIG. 4A above. As illustrated in FIG. 5B, the initial processing result can be substantially free of identification information transmitted from the content provider 104, such as cookies and the like.

The NCC POP 142 also makes a determination of which additional processes will be conducted at the NCC POP 142, at the client computing device 102, or both, as illustrated in FIG. 5A. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing provider 107. The network computing provider 107 may provide updated processing results to the client computing device 102 in response to changes to the content or remote user interaction data from the client computing device 102. During these coordinated processing interactions between the client computing device 102 and the network computing provider 107, identification data may be freely exchanged, as illustrated in FIG. 5B.

Figure 6A:
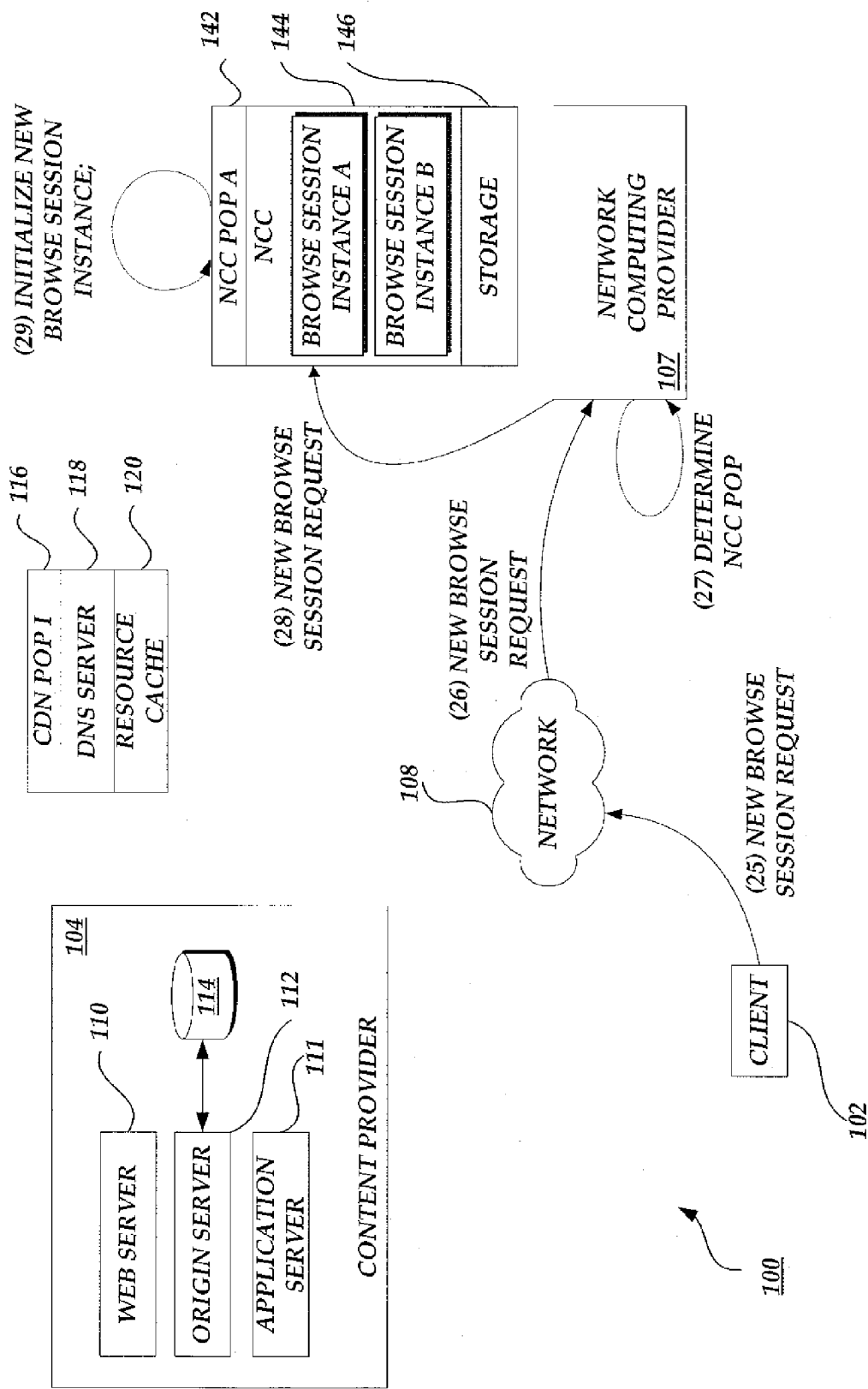
FIG. 6A is a block diagram of the content delivery environment of FIG. 1 illustrating the generation and processing of an additional new browse session request from a client computing device to a network computing provider.

With reference to FIG. 6A, a block diagram of the content delivery environment of FIG. 1 illustrating the generation and processing of an additional new browse session request from a client computing device to a network computing provider is disclosed. As illustrated in FIG. 6A, a second new browse session request may be sent to network computing provider 107 from client computing device 102 across network 108. In an illustrative embodiment, the network computing provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests. In another embodiment, the client computing device 102 request may be processed as a new browse session request to the network computing provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2A and 3A, the network computing provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. Requested content may include any manner of digital content, including Web pages or other documents, text, images, video, audio, executable scripts or code, or any other type of digital resource.

Figure 6B:
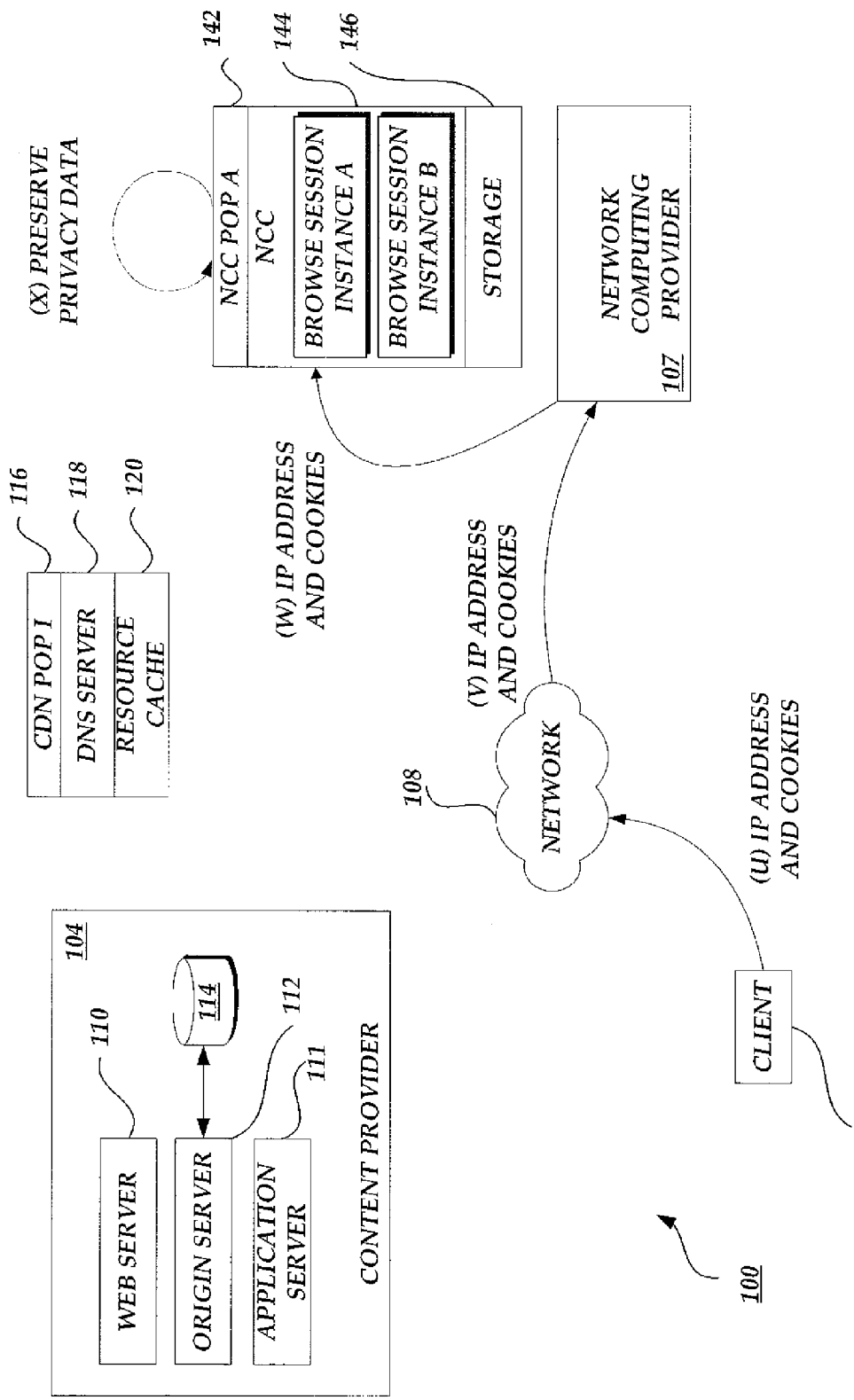
FIG. 6B is a block diagram of the content delivery environment of FIG. 1 illustrating the communication of identification-related data during the processing of an additional new browse session request.
Figure 7:
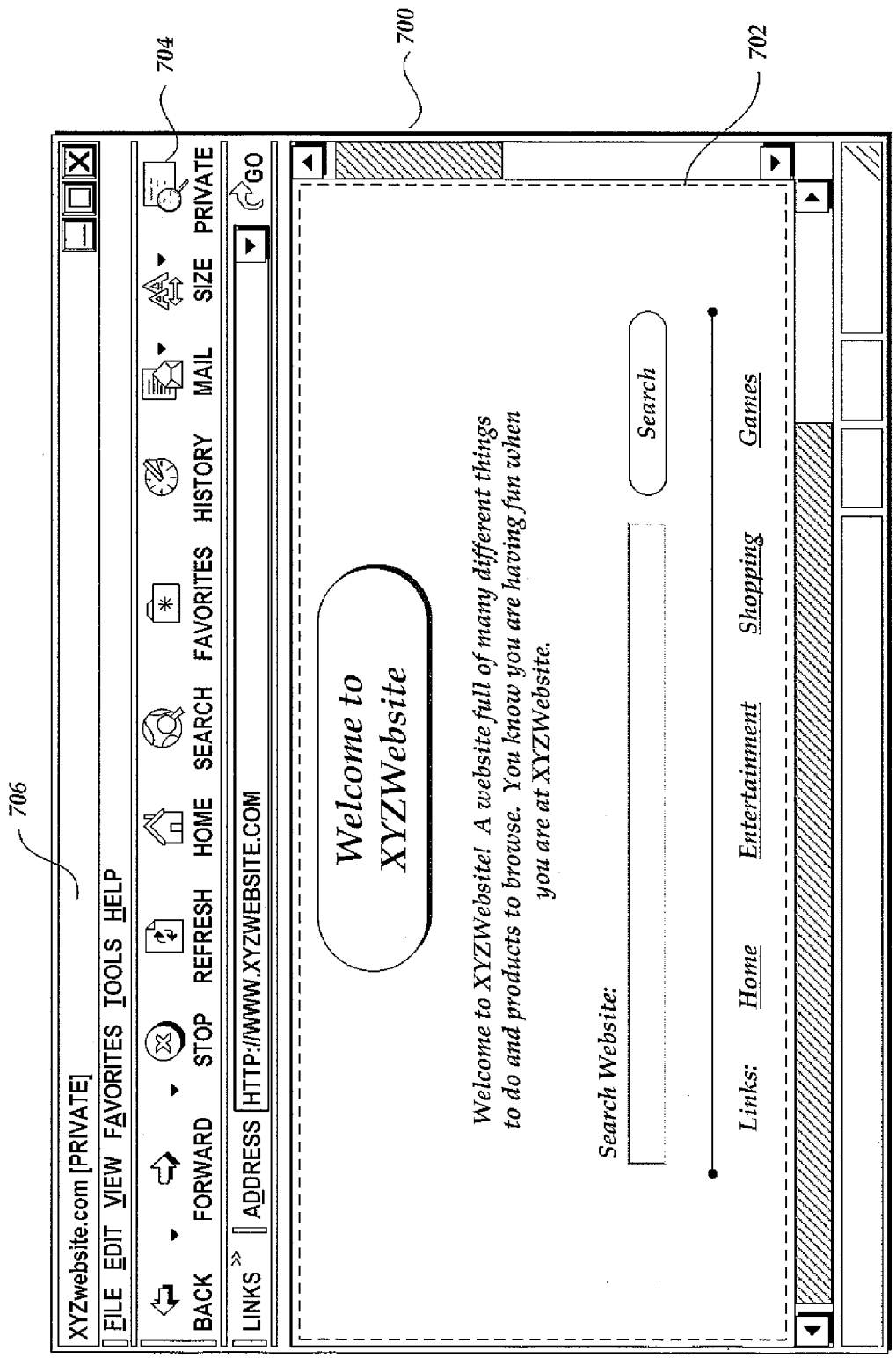
FIG. 7 is a user interface diagram depicting an illustrative browser interface and display of browse session content.

As illustrated in FIG. 6B, the data included in the additional browse session request can include more identification data than was included in previous browse session requests generated by the same client computing device 102. The difference in the amount and content of the identification data transmitted to the network computing provider 107 can be independent of whether the additional browse session request is related to a new browser tab, a new browser window, etc. In some embodiments, the end user of the client computing device 102 can decide to include more identification data in browsing requests by clicking a button, as illustrated in FIG. 7, or by taking some other affirmative action. In some embodiments, the end user and/or the network computing provider 107 can compile a blacklist of domains from which to withhold identification data. In some embodiments, the end user and/or the network computing provider 107 can compile a whitelist of domains to transmit identification to. Furthermore, in some embodiments a change in the amount of identification data to transmit does not depend on a new browsing request, but rather can occur from request to request within a single browsing session and even within a single request when multiple resources are responsive to the request.

As illustrated in FIG. 6A, subsequent to the receipt of the browse session request the network computing provider 107 may select an associated network computing component such as NCC POP 142 to service the browse session request. As discussed above with reference to FIG. 2A, a network computing provider 107 may select an NCC POP to service a browse session request based on any number of factors, including, but not limited to available NCC POP resources (e.g., available memory, processor load, network load, etc), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing provider 107 may select a number of NCC POPs to service a browse session request. Illustratively, although the network computing provider 107 is depicted here for purposes of illustration as selecting NCC POP 142, the network computing provider 107 may select any extant NCC POP to service the browse session request. For example, a single client computing device 102 may simultaneously or sequentially provide three different browse session requests to the network computing provider 107 corresponding to different network resources. The network computing provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2A.

FIG. 7 is a user interface diagram depicting an illustrative browser interface and display of browse session content. As described above with reference to FIG. 5A, a browser 700 may have a content display area 702, as well as one or more one or more local interface components. These local interface components may include toolbars, menus, buttons, address bars, scroll bars, window resize controls, or any other user interface controls. For example, the local interface components can include a privacy button 704 and a title bar 706. Illustratively, local interface components may be displayed as separate from the content display area or may be overlaid or embedded in the content display area.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

In another example, the selection of the privacy button 704 can be handled as both a local user interaction and a remote user interaction. The processing required to provide interface feedback can be handled at the client computing device 102, while the command to enter or exit privacy mode, activate or deactivate a privacy profile, etc. can be transmitted to the NCC POP 142. The NCC POP 142 can then remove or retain identification data included in resource requests from the client computing device 102 as described with respect to FIG. 2B-6B, above, depending on the privacy profile which has been activated in response to the selection of the privacy button. The title bar 706 can be colored or textured, can display an icon or text, or can otherwise be altered to provide the user with feedback regarding the active privacy profile. For example, the title bar can be configured to display the name of the active privacy mode in addition to title of the network resource displayed in the content display area 702.

Figure 8:
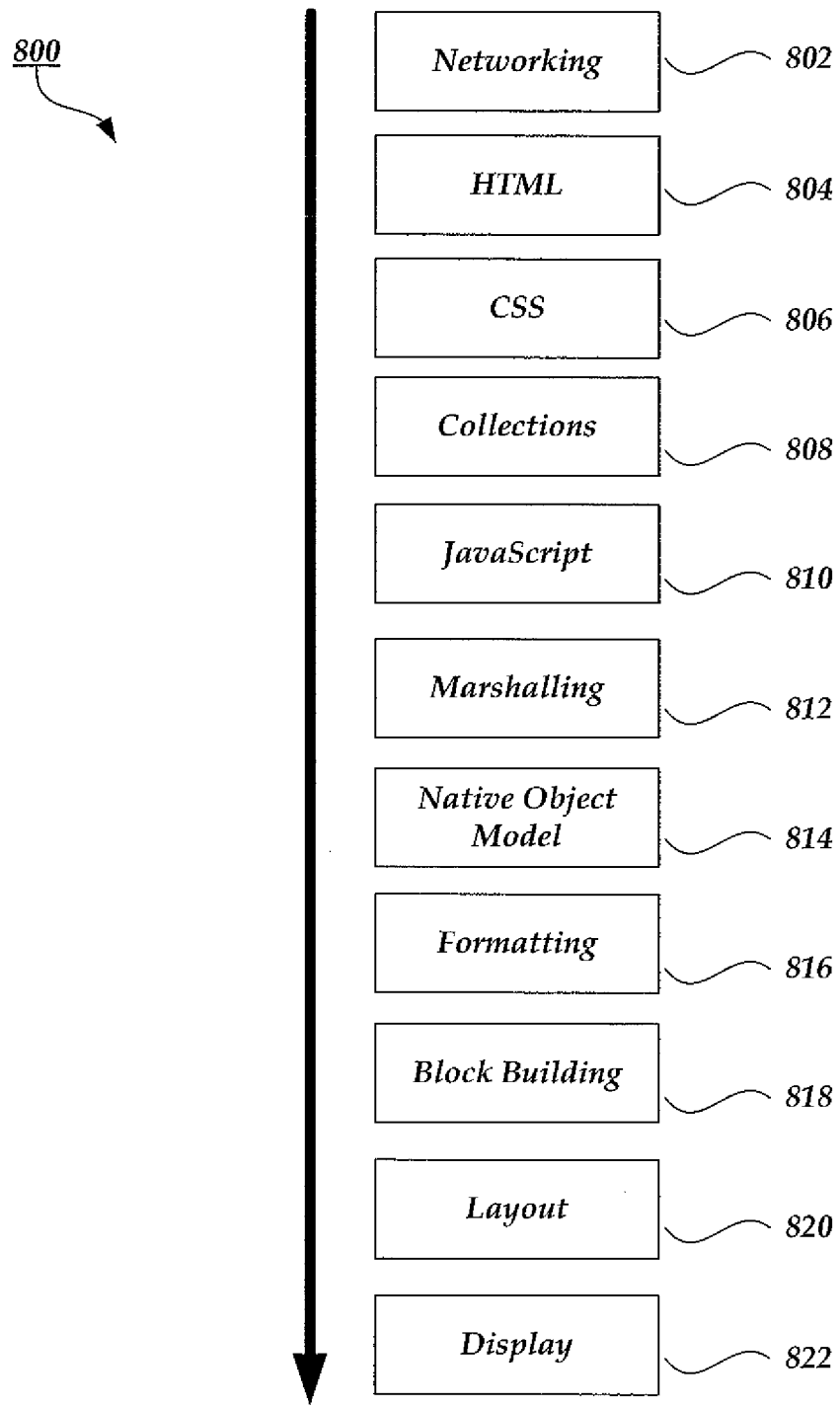
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions. Illustratively, and as described above with reference to FIGS. 3A-5A, a remote session browsing configuration may specify a split between processing actions performed at a network computing provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of Web pages or other Web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When Javascript is encountered, it may be passed directly to a JavaScript subsystem 810 responsible for executing the script. The Javascript subsystem 810 has been examined fully over the years, and may be one of the most well known browser subsystems in the art. A remote session browsing configuration that splits processing actions at a Javascript subsystem 810 may construct a processing result including an internal representation of one or more Javascript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
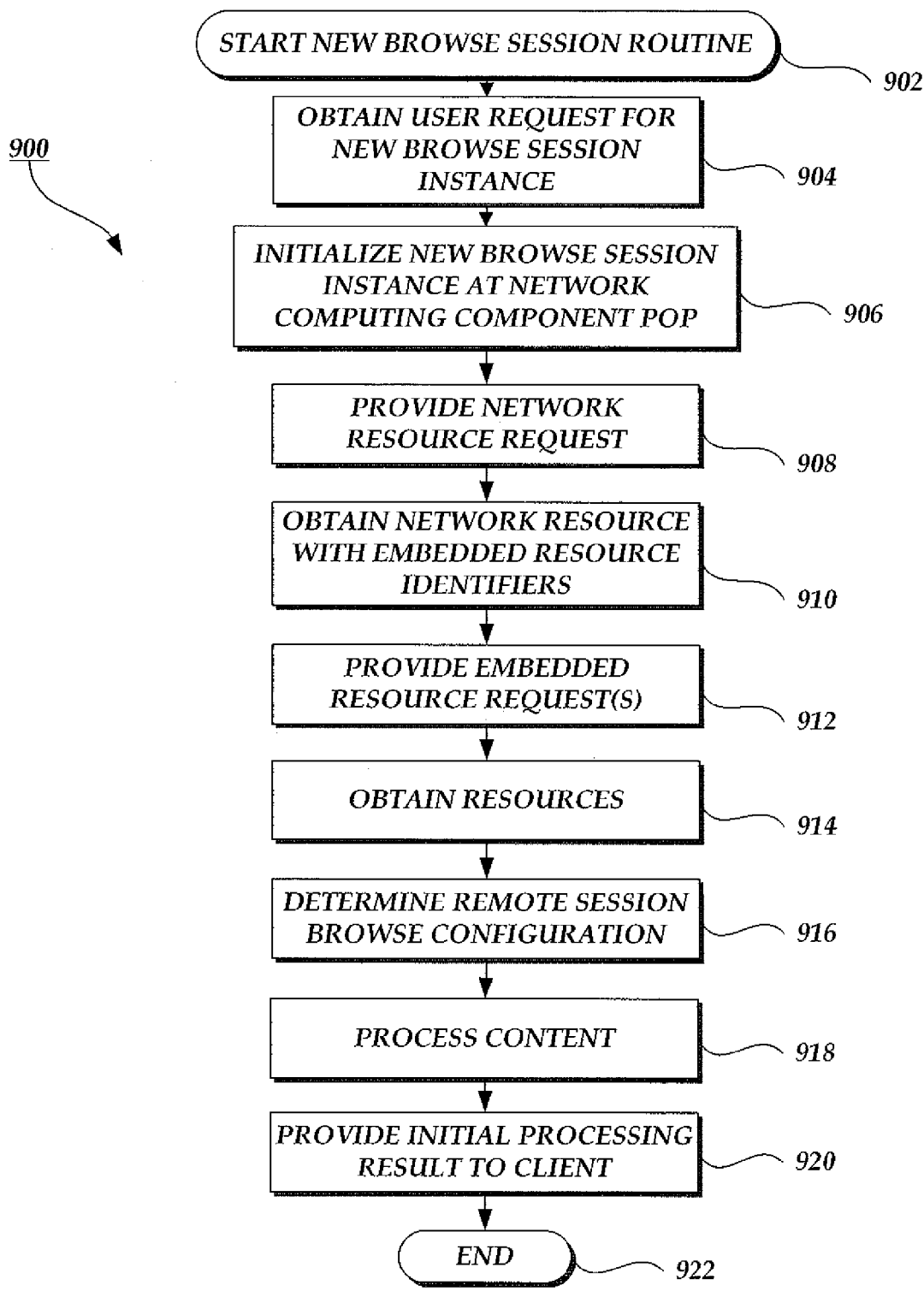
FIG. 9 is a flow diagram illustrative of a new browse session routine implemented by network computing provider.

FIG. 9 is a flow diagram illustrative of a new browse session routine 900 implemented by network computing provider 107 of FIG. 1. New browse session routine 900 begins at block 902. At block 904, the network computing provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing provider 107 may select an associated NCC POP to instantiate a new browse session based on the browse session request. As discussed above with reference to FIG. 1, a network computing provider 107 may include any number of NCC POPs distributed across any number of physical or logical locations. A network computing provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing provider 107 may select a number of NCC POPs to service a browse session request. For example, the network computing provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing provider 107, NCC POP 142 may obtain the browse session request. In one embodiment, NCC POP 142 may have the browse session request forwarded to it by a component of network computing provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing provider 107, may be provided with a subset of information (e.g., just a network address of requested content), or may be provided additional information not included in the original browse session request.

Subsequent to the NCC POP 142 being selected, the network computing provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing provider or NCC POP 142 may instantiate any number of new virtual machine instances and/or browser instances (or make use of existing instantiated instances) based on a single browse session request.

At block 908 the network computing provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing provider 107. One of skill in the art will appreciate that, in the case of other embodiments, the link or network address may correspond to a document or file stored in a digital file locker or other network storage location or at a cache component associated with the network computing provider 107 or client computing device 102. In some embodiments, the new session request may include a document or file in addition to or as an alternative to a network address. At block 910, the network computing provider 107 obtains the one or more network resources. Subsequent to obtaining the requested network resource, the NCC POP 142 may process the network resource to extract embedded resource identifiers.

At block 912, the network computing provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing provider 107 may obtain these embedded resources from any number of different sources, sequentially or in parallel.

At block 916, the network computing provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing and storage service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., Web pages, video, Flash documents) may require various processing actions before being displayed on a computing device. A Web page, for example, may be parsed to process various HTML layout information and references to associated resources or embedded content such as CSS style sheets and Javascript, as well as embedded content objects such as images, video, audio, etc. The HTML and each referenced object or piece of code will typically be parsed and processed before a representative object model corresponding to the Web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of piece of network content be performed at the remote computing device, such as the NCC POP 142, rather than at the client computing device 102. Network content partially (or wholly) processed at the network computing provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, Javascript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy Web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time, or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or Javascript information defining page layout). The NCC POP 142 may therefore select a remote session browsing configuration that performs a substantial amount of processing at the network computing provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing provider 107. The remote session communication protocol may thus achieve smaller delays and smoother presentation when presented with simple network content that requires very little processing or network content that requires rapid change in displayed content after its initial load. For example, a Web page with embedded video may perform better performing the majority of processing locally and utilizing HTML rather than RDP as a remote session communication protocol. A remote session browsing configuration specifying extensive processing at the network computing provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive Web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a Web page. The NCC POP 142 may thus process the Web page together with all embedded content based on the selected remote browsing session protocol, and utilize the remote browsing session protocol to exchange user interaction data and updated browse session data for all embedded content associated with the Web page. In another embodiment, the NCC POP 142 may select different remote session browsing configurations for one or more resources in a set of network content. For example, a network resource such as a Web page may reference processing intensive embedded Javascript or CSS resources, as well as embedded video resources. The NCC POP 142 may select a first remote session browsing configuration for the Web page and all embedded resources excluding the embedded video resource, and a second remote session browsing configuration for the embedded video resource. Illustratively, this may result in the NCC POP 142 utilizing RDP to send a processing result to the client computing device 102 for display of the Web page and associated embedded resources, while utilizing HTTP to send the embedded video as a separate, unprocessed file. In one embodiment, the client computing device 102 may perform the minimal processing required to display the RDP processing result corresponding to the Web page and embedded resources, and may also perform additional processing necessary to display the embedded video, for example, overlaying the video on top of the displayed RDP representation of the Web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instance executing at an NCC POP 142. In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html Web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5A and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a Web page corresponding to a processing result from the NCC POP 142 (e.g., RDP display information representing the rendered page) until the browser is finished processing and rendering the Web page locally. The browser may then replace the representation from the NCC POP 142 with the locally rendered representation of the Web page. Illustratively, replacing one representation with another representation may be transparent to the user. For example, the local and NCC POP 142 representations of the Web page may be identical or substantially identical. In one embodiment, when the NCC POP 142 representation of the web page is displayed, the browser may send various user interactions with the displayed page to the NCC POP 142 for processing. When the locally rendered version of the Web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing and storage component 107 may select between a remote and local browse session based on any of the factors enumerated with regards to determining a remote session browse protocol above In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing provider 107 may instantiate a browse session instance running on a first NCC POP and utilizing an RDP protocol as well as browse session instance running on a second NCC POP utilizing an X-Windows protocol. The client computing device 102 or the network computing provider 107 may determine which browse session instance and protocol should be used based on performance or resource usage considerations as described with regards to determining a remote session browse protocol above.

With continued reference to FIG. 9, at block 918, the network computing provider 107 may process the obtained content, including the one or more requested network resources and embedded network resources, according to the determined remote session browsing configuration to generate an initial processing result. At block 920, the network computing provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
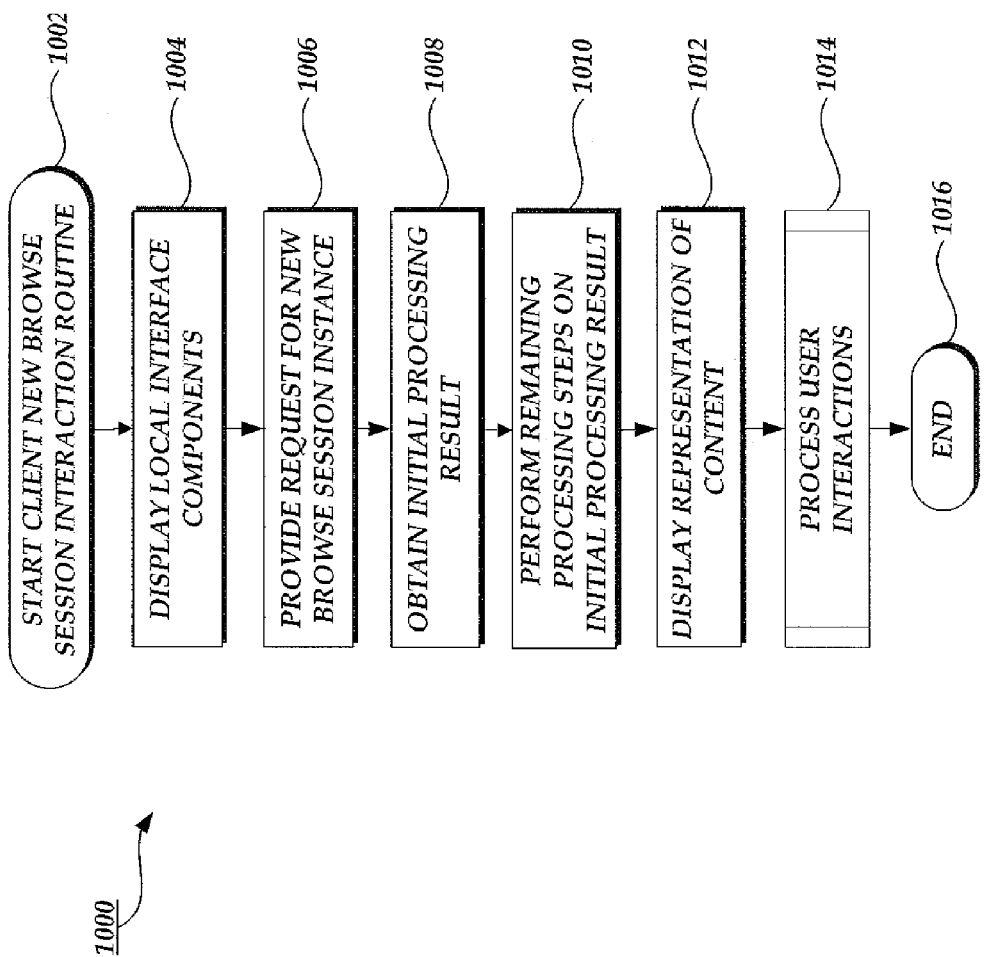
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5A and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2A, the browse session request is transmitted first to a network computing provider 107. In an illustrative embodiment, the network computing provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing provider receiving a request for a new browse session instance at block 904 of FIG. 9 above.

At block 1008, the client computing device 102 obtains an initial processing result from the network computing provider 107. Illustratively, the format and data included in the initial processing result may vary based on the remote session browsing configuration selected by the network computing provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7 above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a Web page and associated content for display via RDP in a browser instance running in a virtual machine instance at the NCC POP 142. The browser instance may have one or more interface elements such as toolbars, menus, scroll bars, etc., in addition to the displayed Web page. The NCC POP 142 may send an RDP processing result corresponding to the displayed Web page only, without any of the interface elements associated with the browser. Illustratively, including an RDP processing result corresponding to the displayed Web page only may allow the browser at the client computing instance 102 to display the Web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing and storage service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
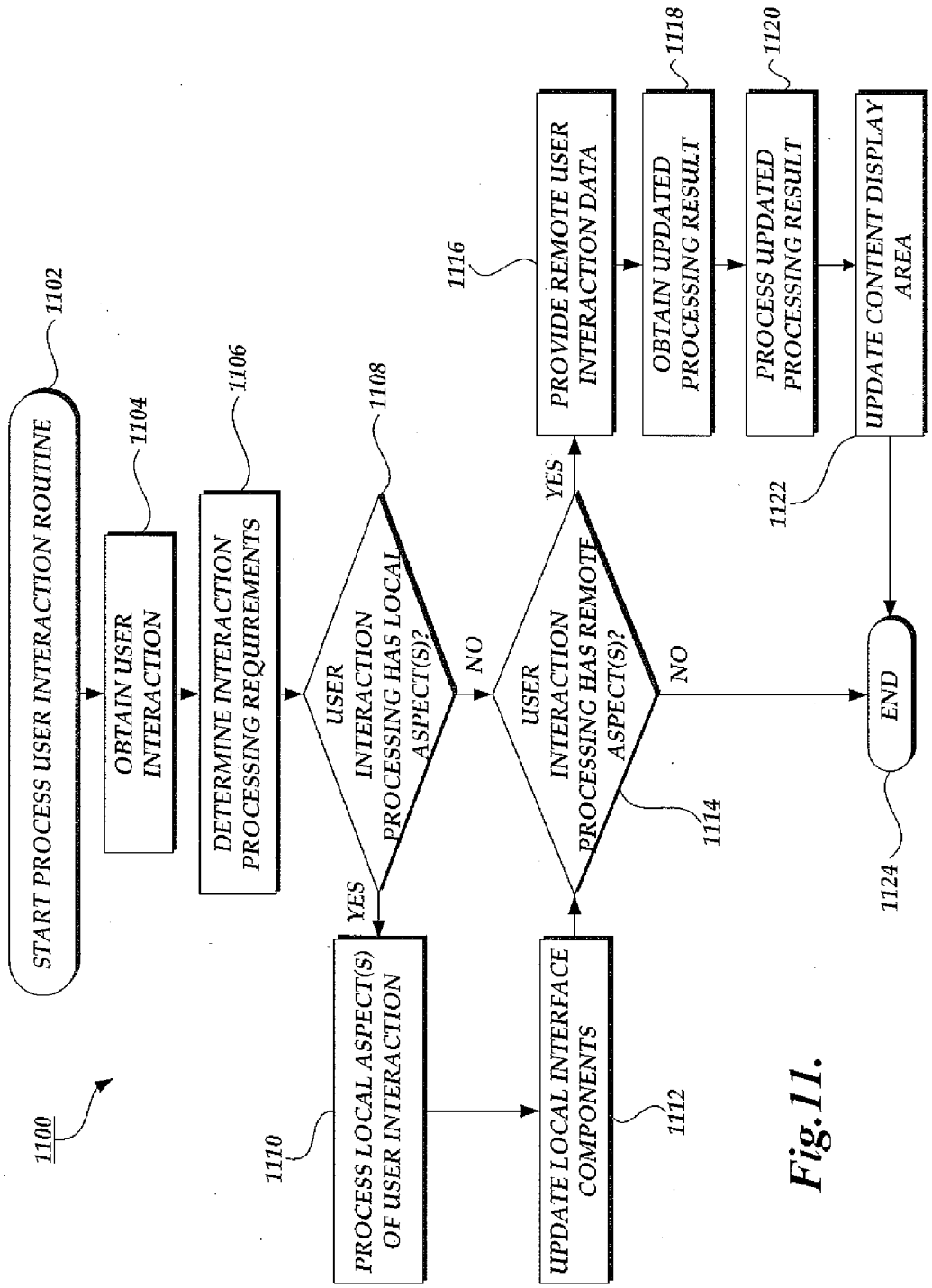
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a Web page may require processing and may change the configuration or visual appearance of the Web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7. For example, some local interface components may be managed locally by browser code running on the client computing device, while other local interface components may have one or more locally managed aspects (e.g., button click feedback, scroll bar redraw, etc), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7 and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7 and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect (s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing provider 107. Illustratively, in the case of a heavily server side remote session browsing configuration utilizing an RDP remote session communication protocol, the remote user interaction data may include input data such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing provider 107 on a continuous basis, while in other embodiments of remote session browse configurations remote user interaction data may only be provided to the network computing provider 107 when associated with a user interaction that requires remote processing.

At block 1118, the client computing device 102 obtains an updated processing result from the network computing provider 107, the network computing provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1102 ends. Illustratively, the routine may be executed again any number of times in response to further user interactions with the browser and displayed content.

Figure 12:
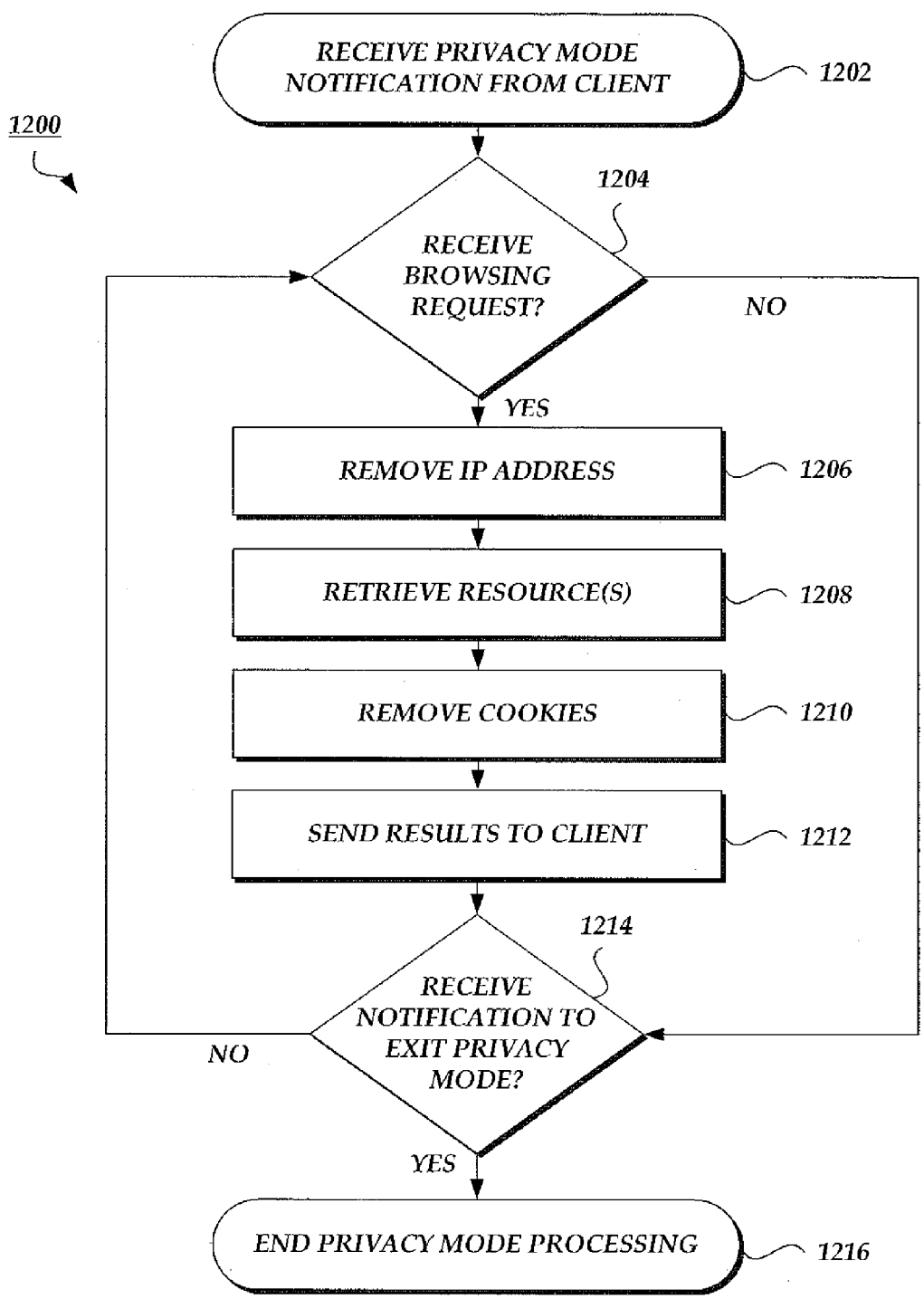
FIG. 12 is a flow diagram illustrative of a routine for removing identification data during the processing of a network resource request from a client computing device.

FIG. 12 is a flow diagram illustrative of a routine 1200 for processing browsing requests in a privacy mode. In certain cases, the user may wish to limit the amount of identification data included in requests for network resources. Identification data can include, for example, any data transmitted to content providers that may be used to determine the identity of the end user or the client computing device 102 from which the request originated. As described above with respect to FIGS. 2B-6B, examples of identification data include the IP address and MAC address of the client computing device 102, cookies, HTTP headers, and the like.

The routine 1200 begins at block 1202, where the network computing provider 107 receives a notification from the client computing device 102 to process subsequent requests in privacy mode. In one example, an end user of a client computing device 102 may be requesting network resources, such as web pages, from content providers 104 with which the end user is not familiar. In such cases, the end user may wish to limit the amount of identification data that is sent to the content provider 104. The end user can indicate this preference by clicking a private button 704 on the graphical user interface of the browsing application as illustrated in FIG. 7, updating a configuration setting in a menu option, electing to send identification information only to domains on a whitelist, etc. The routine 1200 then proceeds to decision block 1204.

At decision block 1204, the network computing provider 107 determines whether it has received a browsing request from the client computing device 102. If the network computing provider 107 does not receive a browsing request, the routine 1200 can proceed to decision block 1214, where the network computing provider 107 determines whether it has received a notification from the client computing device 102 to exit privacy mode. If the network computing provider 107 has not received such a notification, the routine 1200 returns to decision block 1204. The routine 1200 can proceed in this execution loop until either a browsing request or notification to exit privacy mode is received. In some embodiments, rather than an execution loop the routine can include monitoring functions. For example, the network computing provider 107 can be configured to wait for either a browsing request or a notification to exit privacy mode, rather than make affirmative determinations about whether there is a browsing request or notification to exit privacy mode. In response to receiving a browsing request, the network computing provider 107 can forward the request to an NCC POP 142, as described above with respect to FIG. 2A, and then proceed to block 1206.

At block 1206, the NCC POP 142 can process the browsing request to remove identification data. In one example, the NCC POP can remove the IP address of the client computing device 102. In some embodiments, there is more than one piece of identification data included in the original request from the client computing device 102. Additionally, there can be any number of privacy profiles to apply to the request when in privacy mode. For example, some content providers 104 can use the IP address of the client computing device to determine the geographic location of the client computing device 102 to provide local content. The client computing device 102 can activate a profile indicating that the IP address of the client computing device 102 can remain part of the request and be transmitted to a content provider 104, while cookies, HTTP headers, and other identification information can be removed from the request. Some privacy profiles may indicate that no identification information remain in the request, while other may indicate a specific combination of identification data that is to remain in the request, etc. After the NCC POP 142 has applied the privacy profile to the request, the routine 1200 can proceed to block 1208.

At block 1208, the NCC POP 142 can retrieve the requested resources. As illustrated in FIGS. 3A and 4A, described above, the retrieval of resources can involve transmitting a request to a content provider 104, a CDN service provider 106, or some other content source. The resource can comprise any number of embedded resources, which can be retrieved from one or more content providers 104, CDN service providers 106, or other content sources. Each of these requests—the original request and the requests for resources embedded in the resource responsive to the original request—can include identification data to a varying degree, based on the active privacy profile. For example, when a client computing device 102 requests a network resource forecast of the weather, the client computing device's 102 IP address or other geolocation data can be transmitted to the content source 104 along with the request, while cookies, HTTP headers, and other identification data can be removed from the request before it is transmitted to a content provider 104. Advertisement resources embedded in the same page can be requested without including the IP address or any other identification. After the NCC POP 142 has received the requested resource and any embedded resources, the routine 1200 can proceed to block 1210.

At block 1210, the NCC POP 142 can remove any identification data that have been returned from the content provider 104 with the requested resource. For example, when a weather forecasting provider returns a web page containing a weather forecast, the provider can include cookies to be placed on the client computing device 102. In normal operation, the cookie can be transmitted back to the content provider 104 during subsequent requests, and can help to determine who the end user is, what other resources the end user has accessed, etc. The content provider 104 can use the cookies, for example, to display advertisements to the user that may be related to several of the resources that the user has already requested. In some cases, the cookies can be used to track the user's resource requests across multiple content providers 104. To avoid this sequence of events, the NCC POP 142 can remove the cookies from the response before returning the requested resource to the client computing device 102.

In some embodiments, the NCC POP 142 can retain the cookie or other identification data for future use. For example, the user may wish to receive the benefits of personalized responses that cookies can facilitate, but the user does not want the cookies physically stored on the client computing device 102. In these situations, the cookie can be stored on the NCC POP 142 in storage 146, in the browse session instance 144, or any other suitable storage area. When subsequent requests are made for network resources from the content provider 104, the cookie can be added to the request and transmitted to the content provider 104, even though the cookie was not actually sent by the client computing device 102.

After the cookies or other identification data has been removed from the response according to the active privacy profile, the routine can proceed to block 1212. At block 1212, the NCC POP 142 can transmit the response to the client computing device 102. As described above with respect to FIG. 7, the response can be processed to a large or small degree by the browse session instance on the NCC POP, and in some cases only a small amount of data related to the response is transmitted to the client computing device 102.

After the NCC POP 142 has transmitted the data to the client computing device 102, the routine 1200 can proceed to decision block 1214, where the NCC POP can determine whether the end user has transmitted a notification to exit privacy mode. Execution of the routine 1200 can proceed as described above with respect to block 1204, until the NCC POP 142 determines that the user has transmitted a notification to exit privacy mode, in which case execution of the routine 1200 proceeds to block 1216, where the routine 1200 terminates.

Figure 13:
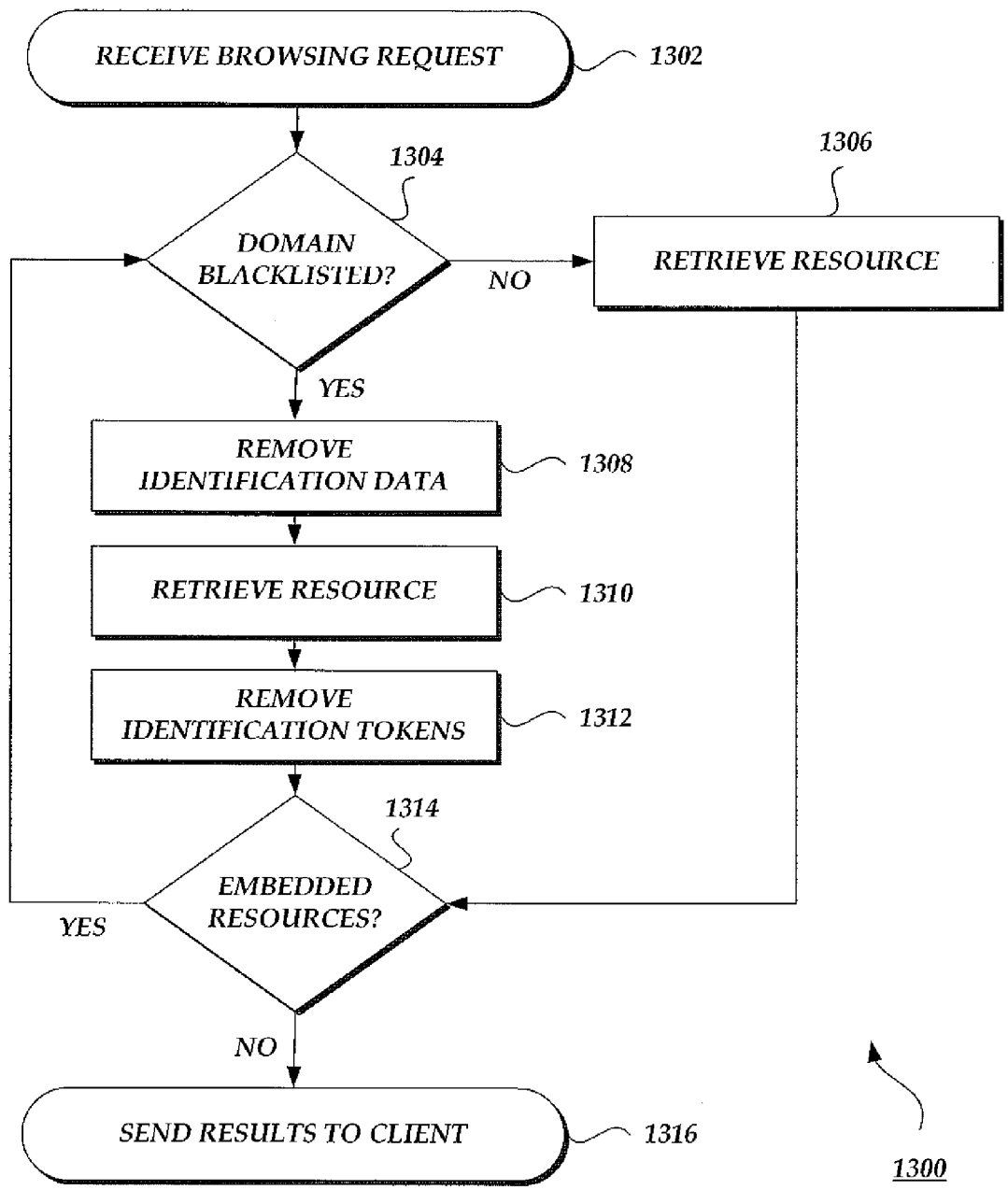
FIG. 13 is a flow diagram illustrative of a routine for removing identification data during the processing of a network resource request from a client computing device.

FIG. 13 illustrates an example routine 1300 for processing browsing requests for resources from multiple content providers 104, such as web sites. The request itself can be for multiple resources. In some embodiments, the request can be for a single resource, such as a web page, which in turn comprises one or more embedded resources from other web sites. In such a case, it can become necessary to determine which of many possible privacy profiles to apply to each of the resources to be retrieved. For example, a typical request to a weather forecasting web site for a web page can result in the retrieval of resources from not only the weather forecasting web site, but also from advertising providers displaying advertisements on the requested web page, from web sites affiliated with the weather web site such as news web sites, from web site code libraries containing commonly used components such as Javascript files, etc. A user may have a separate privacy profile applicable to each of the different web sites, requiring iterative and/or recursive processing to ensure that all customized responses desired by the end user are indeed received, while other web sites are nevertheless prevented from accessing identification data related to the end user or client computing device 102, as described above.

The routine 1300 begins at block 1302, where the NCC POP 142 receives a browsing request from a client computing device 102. In response to receiving the browsing request, execution of the routine 1300 can proceed to decision block 1304.

At decision block 1304, the NCC POP 142 determines whether the content provider 104, such as a web site or domain, hosting the requested resource has been blacklisted. If the domain has been blacklisted, execution of the routine 1300 can proceed to block 1308. Otherwise, execution of the routine 1300 can proceed to block 1306. At block 1306, the resource is requested from the content provider 104. Execution can then proceed to decision block 1314.

For example, a user may define a blacklist of domains from which to withhold identification data. In some embodiments, the network computing provider 107 can compile a blacklist of domains from which to withhold identification data. The blacklist compiled by the network computing provider 107 can be based on observed behavior over the course of time, can be compiled from any number of third party blacklists, or can be compiled by any other suitable method or combination thereof. In some embodiments, a whitelist is used instead of, or in addition to, a blacklist. For example, if a domain is listed on a whitelist, execution can proceed to block 1306. Otherwise, execution can proceed to block 1308, as if the requested domain were on a blacklist.

At block 1306, the NCC POP 142 can remove identification data from the request before transmitting the request to a content provider 104, CDN service provider 106, or other content source. As described above, the identification data can include the IP address of the client computing device, etc. In some embodiments, rather than affirmatively remove the identification data, the NCC POP 142 instead transmit only the non-identify portion of the request. Execution of the routine 1300 can then proceed to block 1310.

At block 1310, the NCC POP 142 can transmit the altered or newly created request and retrieve the network resource from the content provider 104, CDN service provider 106, or other content source. In response to receiving the network resource, the routine 1300 can proceed to block 1312.

At block 1312, the NCC POP 142 can remove identification data from the response, according to the active privacy profile. As described above, the identification data can include cookies. The cookies can be stored at the NCC POP 142, the network computing provider 107, or otherwise discarded. Execution of the routine 1300 can then proceed to decision block 1314.

At decision block 1314, the NCC POP 142 can determine whether there are any embedded resources to retrieve in order to fully respond to the request. If there are embedded resources, execution of the routine 1300 can return to decision block 1304, where the NCC POP 142 determines, for each of the embedded resources, whether the resource is from a blacklisted domain. If there are no embedded resources, execution of the routine 1300 can proceed to block 1316, where the routine 1300 terminates.

Figure 14:
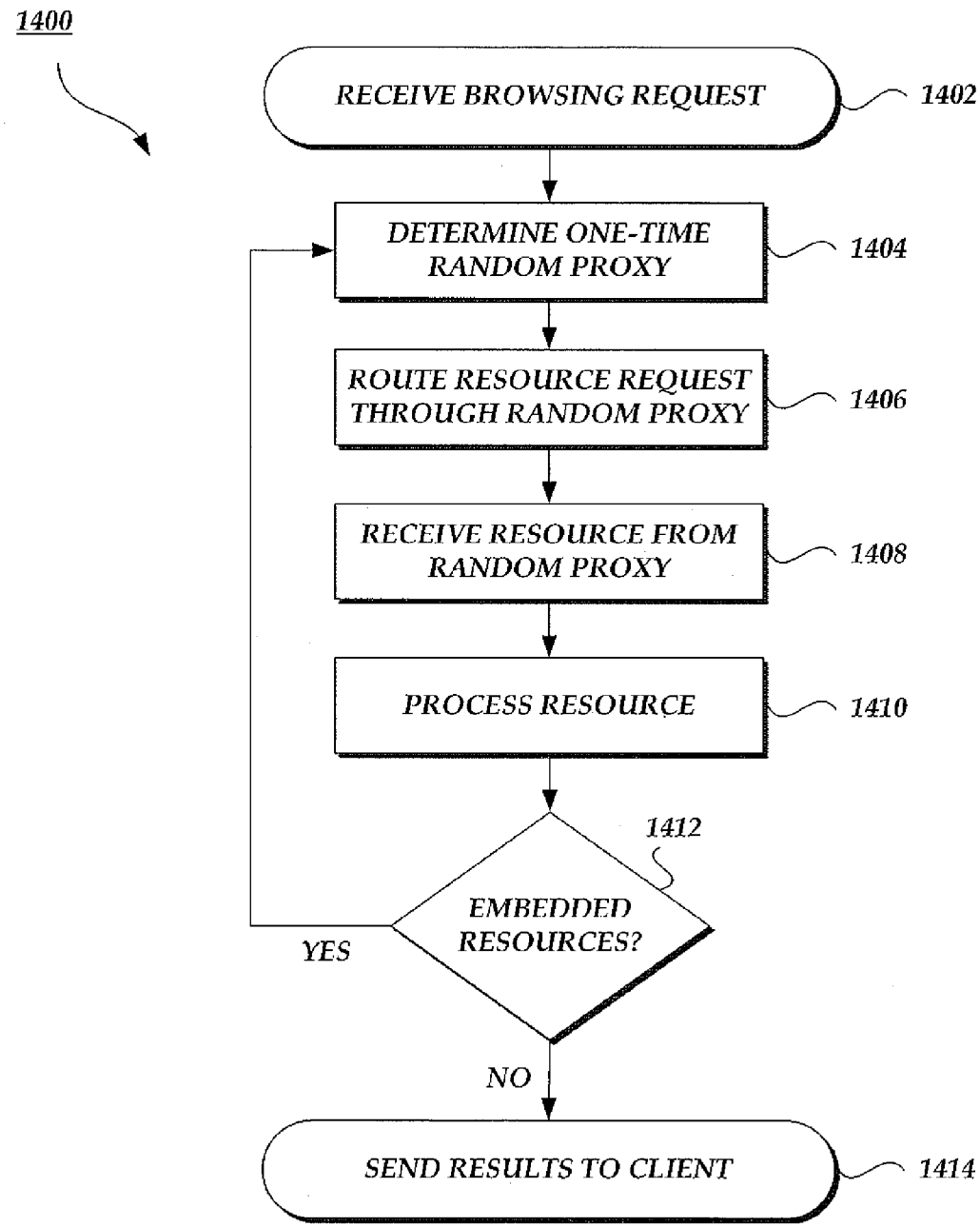
FIG. 14 is a flow diagram illustrative of a routine for obfuscating identification data during the processing of a network resource request from a client computing device.

FIG. 14 illustrates an example routine 1400 for obfuscating identification data. The routine 1400 can be used by the NCC POP 142 to distribute across multiple servers the transmission of requests from a client computing device 102. For example, each request in a browse session that is received by the NCC POP 142 can be transmitted to a content provider 104 through a different server, such as another NCC POP serving as a proxy, a separate proxy server created for this purpose, etc., in order to obfuscate the source of the request. In such a configuration, the client computing device 102 can establish a browsing session and communicate with a single NCC POP 142 over the course of the browsing session, even though each browsing request is routed to another server before being transmitted outside of the network computing provider 104.

The routine 1400 begins at block 1402, when the NCC POP 142 receives a browsing request from a client computing device 102. In response to receiving the request, the routine 1400 can proceed to block 1404.

At block 1404, the NCC POP 142 can determine a random proxy server to route the resource request through when it transmits the resource request to the content provider 104. The random proxy can be used a single time; each subsequent resource request can be routed through a different random proxy. In some embodiments, the proxy is not randomly chosen, but rather selected based on any number of criteria. For example, different proxies can be chosen such that the requests appear to the content provider 104 to be coming from a wide range of geographic locations or from a number of servers within a single geographic region, etc. The usage of different servers to transmit each request from a client computing device 102 can serve to obfuscate the ultimate source of the requests, so that a content provider 104 has difficulty determining which requests have come from a singe device, etc. When the proxy for the current request has been chosen, the routine 1400 can proceed to block 1406.

At block 1406, the NCC POP 142 can route the resource request through the chosen or randomly determined proxy. The browse session can remain on the NCC POP 142; only the request is routed through the proxy. After the NCC POP 142 has routed the request and the proxy has transmitted the request to the content provider 104, the routine 1400 can proceed to block 1408

At block 1408, the proxy can receive the requested resource from the content provider 104 and forward it to the NCC POP 142 hosting the browse session from which the resource was requested. The routine 1400 can then proceed to block 1410. In some embodiments, the proxy can perform initial processing on the resource before forwarding it to the NCC POP 142. For example, the proxy can determine whether resource identifiers are embedded within the requested resource, and can proceed to request those embedded resources and forward them to the NCC POP 142 with the originally requested resource.

In response to receiving the resource from the proxy, the NCC POP 142 can process the resource at block 1410. The NCC POP can perform any of a number of tasks described above, for example determining whether and where to split processing between the NCC POP 142 and the client computing device 102, etc.

At decision block 1412, the NCC POP can determine whether any resource identifiers are embedded within the resource. It there are, the routine can return to block 1404 in order to request each of the embedded resources from another proxy. The routine 1400 and decision block 1412 can be executed recursively, for example if an embedded resource also has resources embedded in it.

If the NCC POP 1412 determines that there are no resource identifiers embedded in the resource, or when all embedded resources have been retrieved, execution proceeds to block 1414. At block 1414, the results of the request can be returned to the client computing device 102, and the routine 1400 can terminate.

In some embodiments, identification data other than the IP address associated with the various requests of a browse session can be obfuscated. For example, the values in the user-agent HTTP header can be altered for each request in order to further obfuscate the source of the requests. In some embodiments, the cookies that are transmitted with the request can be altered. For example, the content of the cookies themselves can be altered or a different set of cookies can be transmitted for each request from the same client computing device 102.

In some embodiments, requests from multiple client computing devices 102 and multiple NCC POPs can be routed through the same proxy server. Flooding a content provider 104 with requests from a single server can inhibit or prevent a content provider 104 from determining the ultimate source of any individual request, and inhibit or prevent the content provider 104 from determining the identity of any individual client computing device 102 or end user. In some embodiments, the various NCC POPs of the network computing provider 107 can each be configured to transmit the same cookies with each resource request, regardless of which end user or client computing device 102 generated the request.

Content providers 104 and other content sources can use alternative methods of tracking requestors across multiple requests. Such alternative methods may not rely on IP addresses, MAC addresses, cookies, HTTP headers, and other identification information described above. For example, content providers 104 can append identification data to the URLs of the links contained in a web page that has been requested, and the identification data can be unique, e.g.: it can be a randomly generated token appended to the URLS of the links in web page response generated in response to a first request from a client computing device. If the end user of the client computing device activates one of the links, the URL with the identification token appended can be transmitted to the NCC POP 142 as a new resource request. The NCC POP 142 can use the methods described above to remove IP addresses, MAC addresses, cookies, HTTP headers, etc. from the request and reroute the request through one-time proxy servers. However, if the identification token remains in the URL and therefore is transmitted with the request, the content provider 104 may be able to determine that this particular resource request came from the same client computing device 102 as a previous resource request.

The NCC POP 142 can be configured to remove such identification tokens from resources before the resources are returned to the requesting client computing device 102. For example, the NCC POP 142 can recognize patterns in responses from a content provider 104 indicating that content provider 104 is utilizing an alternative identification strategy. In some embodiments, the NCC POP 142 can receive a notification from an end user to block such alternative identification strategies or the NCC POP 142 can access a list of content providers 104 that are using the alternative identification strategies, etc. When the NCC POP 142 receives a resource from a content provider 142 using an alternative identification strategy such as appending identification tokens to link URLs, the NCC POP 142 can remove the tokens before transmitting the resource to the requesting client computing device 102. In some embodiments, the NCC POP 142 can transmit the resource with the identification tokens to the requesting client computing device 102. Later, when an end user actives a link containing an identification token, the NCC POP 142 can remove the token from the request before transmitting the request to the content provider 104. In some embodiments, the NCC POP 142 can be configured to obfuscate the identification token, for example by modifying the token so that it has the same value for every request transmitted from the network storage and computing provider 107, regardless of which end user or client computing device 102 generated the request.

Obfuscation or removal of identification data from resource requests can have an adverse effect on content providers 104 and other content sources over time. For example, content providers 104 may use IP addresses, cookies, and other identification information to create statistics related to where requests for their content are coming from, what percentage of requests are from repeat requestors, etc. Network computing providers 107 can include information in the anonymous or obfuscated requests that they generate notifying content providers 104 and other content sources that the identification information has been altered or removed altogether. For example, the NCC POP 142 can set an HTTP header value to indicate that the identification data is not accurate. Content providers 104 can inspect that HTTP header value and exclude the requests from their statistical data set. While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached FIGURES should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for maintaining the privacy of a client computing device, the system comprising:
   one or more computer processors;
   a computer memory accessible by at least one of the one or more computer processors; and a network computing component comprising an executable software module in the computer memory, the executable software module executed by the one or more computer processors, wherein the network computing component is operable to:
- host a virtual machine instance including a network-based browsing application on the network computing component, the network-based browsing application in communication with a browsing application of a client computing device;
- receive, from the browsing application of the client computing device, an original browse session request for a network resource, the original browse session request comprising a network address of the network resource and identification data associated with the client computing device;
- in response to receiving the original browse session request for the network resource, generate an independent browse session request for the network resource, by the network-based browsing application, wherein the independent browse session request corresponds to a browse session request for the network resource identified in the original browse session request and wherein the independent browse session request does not include the identification data associated with the client computing device;
- cause transmission of the independent browse session request for the network resource to a network resource provider;
- receive a response from the network resource provider, wherein the response comprises the requested network resource and an identification token, the identification token associated with the network-based browsing application; and
- in response to receiving the response:
  - determine a remote session browsing configuration associated with the network-based browsing application and the browsing application of the client computing device, wherein the remote session browsing configuration comprises a remote session communication protocol and comprises information designating respective processing actions performed on the requested network resource by either the network-based browsing application or by the browsing application of the client computing device;
  - process, with the network-based browsing application, at least a portion of the requested network resource; and
  - transmit a portion of the response to the browsing application of the client computing device from the network-based browsing application via the remote session communication protocol, wherein the transmitted portion of the response does not comprise the identification token.

2. The system of claim 1, wherein the identification data comprises at least one of an IP address, a MAC address, a cookie, or an HTTP header.

3. The system of claim 1, wherein the identification token comprises a cookie.

4. The system of claim 1, wherein the identification token is retained by the network computing component after transmitting the portion of the response to the browsing application of the client computing device.

5. A computer-implemented method for maintaining the privacy of a client computing device, the computer-implemented method comprising:

- receiving, by a network computing component configured to host a virtual machine instance including a network-based browsing application, an original browse session request for a network resource, wherein:
  - the original browse session request is received from a client computing device configured with a browsing application;
  - the browsing application of the client computing device is in communication with the network-based browsing application hosted by the network computing component; and
  - the original browse session request includes identification data associated with the client computing device;
- in response to receiving the original browse session request for the network resource, generating an independent browse session request for the network resource, by the network-based browsing application, wherein:
  - the independent browse session request corresponds to a browse session request for the network resource identified in the original browse session request; and
  - the independent browse session request does not include at least a portion of the identification data included in the original browse session request received from the client computing device;
- transmitting, to a network resource provider, the independent browse session request for the network resource;
- receiving a response from the network resource provider; and
- in response to receiving the response from the network resource provider:
  - determining a remote session browsing configuration associated with the network-based browsing application and the browsing application of the client computing device, wherein the remote session browsing configuration comprises a remote session communication protocol and comprises information designating respective processing actions performed on the response by either the network-based browsing application or by the browsing application of the client computing device; and
  - transmitting a portion of the response to the browsing application of the client computing device from the network-based browsing application via the remote session communication protocol,
- wherein the method is implemented by a computer system comprising computer hardware configured with specific executable instructions.

6. The computer-implemented method of claim 5, wherein the identification data comprises at least one of an IP address, a MAC address, a cookie, or an HTTP header.

7. The computer-implemented method of claim 5, wherein the response received from the network resource provider comprises the network resource and a first identification token, wherein the portion of the response transmitted to the browsing application of the client computing device does not comprise the first identification token.

8. The computer-implemented method of claim 7, wherein the first identification token comprises a cookie.

9. The computer-implemented method of claim 7, wherein:
- the response comprises the network resource and a reference to an embedded resource;
- the reference comprises a network address of the embedded resource; and
- the computer-implemented method further comprises:
  - transmitting a browse session request for the embedded resource to a second network resource provider;

receiving a response from the second network resource provider, wherein the response from the second network resource provider comprises the embedded resource and a second identification token; and transmitting a portion of the response from the second network resource provider, wherein the transmitted portion of the response from the second network resource provider does not comprise the second identification token.

10. The computer-implemented method of claim 7, the computer-implemented method further comprising retaining the first identification token after the response has been transmitted to the browsing application of the client computing device.

11. The computer-implemented method of claim 5, wherein the independent browse session request transmitted to the network resource provider comprises added identification data.

12. The computer-implemented method of claim 11, wherein the added identification data comprises an HTTP header.

13. A computer-implemented method for maintaining the privacy of a client computing device, the computer-implemented method comprising:

receiving, by a network computing component, a plurality of original browse session requests for one or more network resources, the plurality of original browse session requests received from a client computing device configured with a browsing application, wherein:
  the browsing application of the client computing device is in communication with a network-based browsing application included in a virtual machine instance hosted by the network computing component; and
  each of the plurality of original browse session requests includes identification data associated with the client computing device;

generating a plurality of independent browse session requests for the one or more network resources with the network-based browsing application based on the plurality of original browse session requests received from the client computing device, wherein the plurality of independent browse session requests are not generated with identification data associated with the client computing device included in the plurality of original browse session requests;

transmitting the plurality of independent browse session requests to one or more network resource providers, wherein the plurality of independent browse session requests are transmitted through one or more proxy devices, and wherein each of the plurality of independent browse session requests is transmitted once;

receiving at least one response from the one or more network resource providers; and in response to receiving the at least one response:
  determining a remote session browsing configuration associated with the network-based browsing application and the browsing application of the client computing device, wherein the remote session browsing configuration comprises a remote session communication protocol and comprises information designating respective processing actions performed on the at least one response by either the network-based browsing application or by the browsing application of the client computing device;
  processing at least a portion of the at least one response, wherein the processing is performed by the network-based browsing application hosted by the network computing component; and
  transmitting a portion of the at least one response to the browsing application of the client computing device from the network-based browsing application via the session communication protocol;

wherein said method is implemented by a computer system comprising computer hardware configured with specific executable instructions.

14. The computer-implemented method of claim 13, wherein each of the plurality of independent browse session requests does not include identification data associated with the client computing device.

15. The computer-implemented method of claim 14, wherein the identification data comprises at least one of an IP address, a MAC address, a cookie, or an HTTP header.

16. The computer-implemented method of claim 14, wherein the plurality of independent browse session requests are transmitted through one proxy device.

17. The computer-implemented method of claim 14, wherein the plurality of independent browse session requests are transmitted through a plurality of proxy devices.

18. The computer-implemented method of claim 17, further comprising randomly determining one of the plurality of proxy devices through which to transmit one of the plurality of independent browse session requests.

19. The computer-implemented method of claim 17, further comprising determining one of the plurality of proxy devices through which to transmit one of the plurality of independent browse session requests based on a geographical location of the one of the plurality of proxy devices.

20. The computer-implemented method of claim 13, further comprising establishing, by the network computing component, a secure connection with the client computing device, wherein the plurality of original browse session requests for one or more network resources is received by the network computing component over the secure connection.

21. A system for maintaining the privacy of a client computing device, the system comprising:
  one or more computer processors;
  a computer memory accessible by at least one of the one or more computer processors; and
  a network computing component comprising an executable software module in the computer memory, the executable software module executed by the one or more computer processors, wherein the network computing component is operable to:
    establish a secure connection with a client computing device;
    host a virtual machine instance including a network-based browsing application, wherein the network-based browsing application is in communication with a browsing application of the client computing device;
    receive, from the client computing device, an original browse session request for a network resource, the original browse session request comprising a network address of the network resource and identification data associated with the client computing device, the original browse session request received over the secure connection;
    in response to receiving the original browse session request for the network resource, generate an independent browse session request for the network resource by the hosted network-based browsing application, wherein the independent browse session request corresponds to a browse session request for the network resource identified in the original browse session request and wherein the independent browse session request does not include the identification data included in the original browse session request;

cause transmission of the independent browse session request for the network resource to a network resource provider;

receive a response from the network resource provider, wherein the response comprises the requested network resource and an identification token;

in response to receiving the response:
    determine a remote session browsing configuration associated with the network-based browsing application and the browsing application of the client computing device, wherein the remote session browsing configuration comprises a remote session communication protocol and comprises information designating respective processing actions performed on the response by either the network-based browsing application or by the browsing application of the client computing device; and
    transmit a portion of the response to the browsing application of client computing device from the network-based browsing application via the remote session communication protocol, wherein the transmitted portion of the response does not comprise the identification token.

22. The system of claim 21, wherein the identification token is retained by the network computing component after transmitting the portion of the response to the client computing device.

23. The system of claim 22, wherein the retained identification token is a cookie.

24. The system of claim 22, wherein the network computing component is further operable to transmit to the network resource provider the original browse session request and the retained identification token.

25. The system of claim 21, wherein the independent browse session request does not include at least a part of the identification data.

26. The system of claim 25, wherein the identification data comprises at least one of an IP address, a MAC address, a cookie, or an HTTP header.

27. The system of claim 21, wherein the network computing component is further operable to:
    process, at least in part, the response received from the network resource provider, wherein the processing is performed by the network-based browsing application of the virtual machine instance hosted by the network computing component.

* * * * *